(12) United States Patent
Shiiki et al.

(10) Patent No.: US 6,617,788 B2
(45) Date of Patent: Sep. 9, 2003

(54) PHOSPHOR AND DISPLAY DEVICE OR LIGHT SOURCE USING THE SAME

(75) Inventors: Masatoshi Shiiki, Musashimurayama (JP); Choichiro Okazaki, Kodaira (JP); Teruki Suzuki, Funabashi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/947,697

(22) Filed: Sep. 7, 2001

(65) Prior Publication Data

US 2002/0053874 A1 May 9, 2002

(30) Foreign Application Priority Data

Sep. 8, 2000 (JP) ........................................ 2000-278669

(51) Int. Cl.[7] .................................................. H01J 29/10
(52) U.S. Cl. ................. 313/582; 313/486; 252/301.4 R
(58) Field of Search .................. 313/582, 486, 313/483, 487; 252/301.4 R

(56) References Cited

U.S. PATENT DOCUMENTS

| | | | |
|---|---|---|---|
| 3,897,359 A | * 7/1975 | Kobayashi et al. | ... 252/301.4 F |
| 4,267,485 A | * 5/1981 | Murakami et al. | .......... 313/486 |
| 4,644,223 A | * 2/1987 | de Hair et al. | ............. 313/487 |
| 4,800,319 A | * 1/1989 | Van Kemenade et al. | .. 313/487 |
| 4,810,930 A | * 3/1989 | Verlijsdonk et al. | ........ 313/486 |
| 5,089,170 A | * 2/1992 | Umemoto et al. | ... 252/301.4 H |
| 5,879,586 A | * 3/1999 | Kitamura et al. | ..... 252/301.4 R |
| 5,977,722 A | * 11/1999 | Yokokawa et al. | .......... 315/207 |
| 5,998,047 A | * 12/1999 | Bechtel et al. | .............. 428/690 |
| 6,077,458 A | * 6/2000 | Shiiki et al. | .......... 252/301.4 R |
| 6,096,243 A | * 8/2000 | Oshio et al. | .......... 252/301.4 R |
| 6,184,618 B1 | * 2/2001 | Justel et al. | ................. 313/463 |

OTHER PUBLICATIONS

A. Ohtsuka, "Technology & Materials of Color Plasma Display Panel", published by C.M.C. K.K., 1996, pp. 41–49.
K. Yoshikawa et al., "S16–2 A Full Color AC Plasma Display with 256 Gray Scale", Japan Display, 1992, pp. 605–608.

* cited by examiner

*Primary Examiner*—Sandra O'Shea
*Assistant Examiner*—Dalei Dong
(74) *Attorney, Agent, or Firm*—Miles & Stockbridge P.C.

(57) ABSTRACT

A phosphor having the following formula:

$$(Ba_{1-a-b-c}Ca_aSr_bM_c)O \cdot xMgO \cdot yAl_2O_3$$

wherein M is at least one element selected from Eu, Tm, Lu and Mn, and a, b, c, x and y satisfy the following conditions: $0 < a \leq 0.01$, $0 < b \leq 0.01$, $0.01 \leq c \leq 0.3$, $0 \leq x \leq 2.2$, and $0 \leq y \leq 12.0$; emits visible light under excitation by ultraviolet light of 100 nm to 400 nm. The phosphor is useful in display devices and light sources.

20 Claims, 7 Drawing Sheets

PHOSPHOR AND DISPLAY DEVICE OR LIGHT SOURCE USING THE SAME

BACKGROUND OF THE INVENTION

The present invention relates to display devices for broadcast receivers with a plasma discharge display panel, computer instruments and the like, including the display panel itself, and light sources having a fluorescent lamp such as the back light of a liquid crystal display or the like.

In recent years, display devices of broadcast receivers, computer instruments and the like using a plasma display panel (hereinafter, referred to as PDP) which is a plasma discharge display panel have come to be mass-produced.

A PDP makes a color display by emitting light from a phosphor placed in a discharge space by using a short-wavelength ultraviolet light generated in the negative glow region in a micro discharge space containing a rare gas (when xenon is used as the rare gas, its resonance line is at 147 nm or 172 nm) as an excitation source.

In a PDP, a resonance line of a rare gas of which the emission wavelength is shorter than that of mercury vapor resonance line (253.7 nm) or the like is used as the excitation source of the phosphor, and the lower limit wavelength thereof is the resonance line of helium (58.4 nm).

The structure of the gas discharge cell of a PDP is, for example, as shown in "Techniques and Materials of Color PDP/published by C.M.C. K.K.", and the typical structure is shown in FIG. 7.

FIG. 7 is an exploded perspective view illustrating the structure of a general surface discharge type color plasma display (PDP), wherein a rear glass substrate 20 on which a red (R) phosphor layer 24, a green (G) phosphor layer 25 and a blue (B) phosphor layer 26 are formed and a front glass substrate 10 made of a glass substrate are laminated to each other to form an integrated body.

The front glass substrate 10 has a pair of display electrodes 11 and 12 formed on a surface confronting the rear substrate 20 in parallel with each other with a constant distance. The display electrodes 11 and 12 are transparent electrodes. Opaque bus electrodes 13 and 14 are provided in combination therewith in order to supplement the electrical conductivity of display electrodes 11 and 12.

The display electrodes 11, 12 and the bus electrodes 13, 14 are coated with a dielectric substance layer 15, and the dielectric substance layer 15 is coated with a protective film 16 made of magnesium oxide (MgO).

Having a high sputter resistance and a high secondary electron releasing coefficient, the magnesium oxide (MgO) protects the dielectric substance layer 15 for ac operation and functions so as to lower the discharge-starting voltage.

The rear glass substrate 20 has, on the surface confronting the front glass substrate 10, an electrode group consisting of address electrodes 21 making a right angle with the display electrodes 11 and 12 of the front substrate 10, and the address electrodes 21 are coated with dielectric substance layer 22. On the dielectric substance layer 22 separation walls (ribs) 23 are provided partitioning the address electrodes 21 from one another in order to prevent spread of the discharge or to limit the domain of discharge. The ribs 23 are made of a low-melting glass, and they are all the same in interval, height and shape of side wall.

The groove surfaces between the ribs 23 are stripe-wise coated with phosphor layers 24, 25 and 26 each emitting a red-colored, green-colored and blue-colored light, successively. Each of the phosphor layers 24, 25 and 26 is formed by mixing a particulate phosphor with a vehicle to prepare a phosphor paste, forming each paste into stripe-like coatings after forming address electrode 21, dielectric substance layer 22 and rib 23 on the rear glass substrate 20 by the method of screen printing or the like, and thereafter removing the volatile component by baking or the like.

Into the discharge space between the front substrate 10 and the rear substrate 20, a discharge gas such as helium, neon, xenon or the like (not shown in the drawing) is sealed.

In this PDP, a gas discharge is carried out by selecting a discharge cell (unit light emitting area or discharge spot) from one of the display electrodes 11 and 12 (for example, display electrode 12) and the address electrode 21, and repeatedly carrying out gas discharge from the selected discharge cell by a sustaining discharge between the display electrodes 11 and 12.

The gas discharge generates a vacuum ultra-violet light, which excites the phosphor layer of the area to emit a visible light. Thus, a color display can be obtained as a combination of light emissions from the unit light-emitting areas each having the phosphor layers 24, 25 and 26, corresponding to the three primary colors (red, green and blue).

Luminance of color PDPs has been improved year by year, until it has reached about 400 cd/m$^2$ at the present time. However, a color PDP is still lower in luminance than the direct-view type CRT color television of which peak luminance is 600 to 1,000 cd/m$^2$, and a further improvement of the performance of a PDP is urgently needed.

BRIEF SUMMARY OF THE INVENTION

It is an object of the present invention to provide green- and blue-light emitting materials and a phosphor film with which a high-performance PDP can be realized.

It is another object of the present invention to provide a light source having a high-performance fluorescent lamp.

The present invention provides a phosphor capable of emitting a visible light under an exciting light of which main component is ultraviolet light having a wavelength ranging from 100 nm to 400 nm, which is represented by the following composition formula:

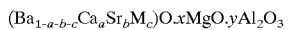

$$(Ba_{1-a-b-c}Ca_aSr_bM_c)O \cdot xMgO \cdot yAl_2O_3$$

wherein M is at least one element selected from the group consisting of Eu, Tm, Lu and Mn, and a, b, c, x and y satisfy the following conditions:

0 < a ≦ 0.01,
0 < b ≦ 0.01,
0.01 ≦ c ≦ 0.3,
0 ≦ x ≦ 2.2, and
4.0 ≦ y ≦ 12.0.

The present invention further provides a display device and a light source using the above-mentioned phosphor.

DETAILED DESCRIPTION OF THE INVENTION

Figure 1:
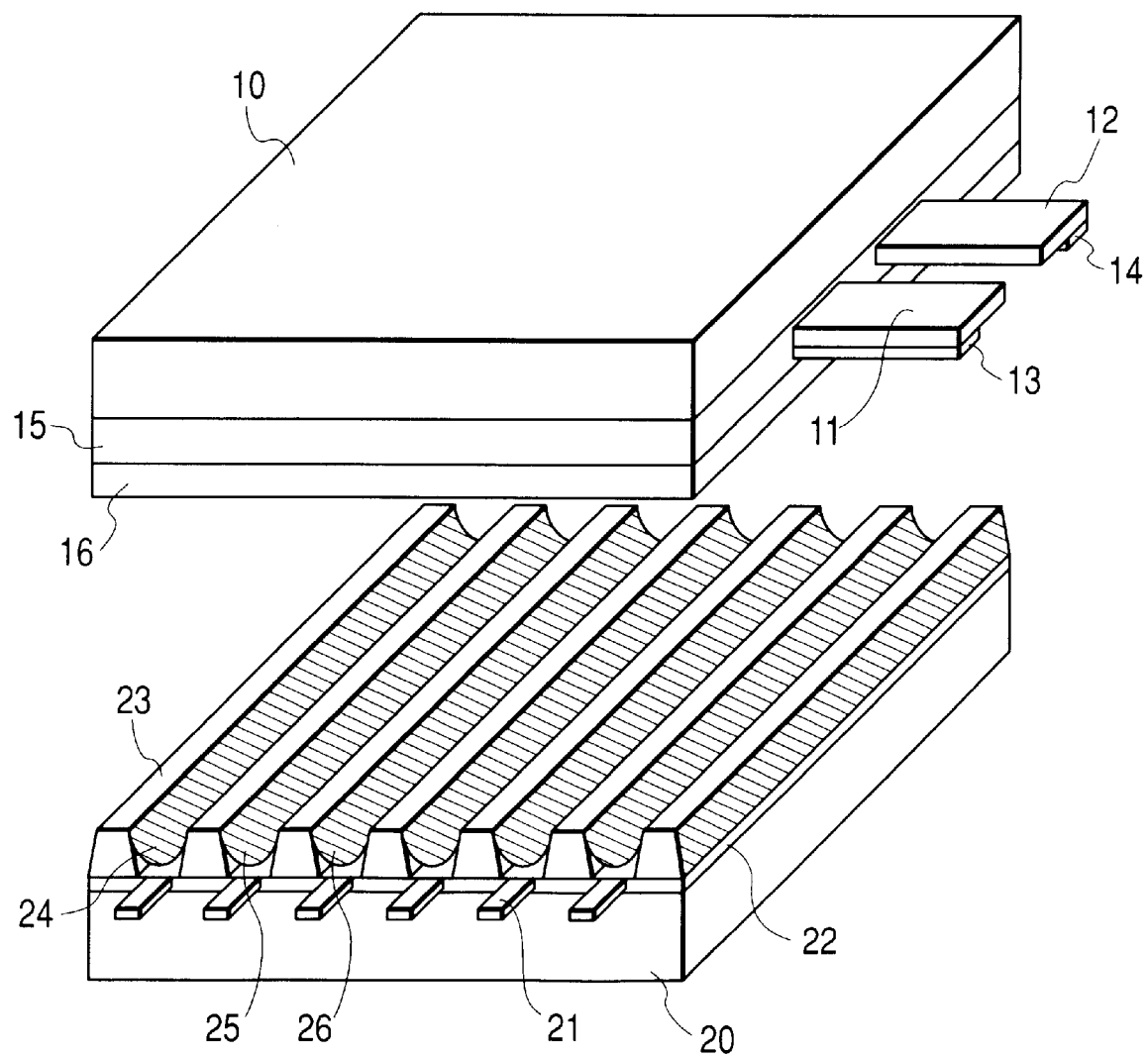
FIG. 1 is an exploded perspective view illustrating the structure of plasma display panel of the plasma display system according to Example 1 of the present invention.

The above-mentioned object of the present invention can be achieved by applying, to PDP or a fluorescent lamp, a phosphor capable of emitting a visible light under an exciting light composed mainly of an ultraviolet light of 100 nm to 400 nm and represented by the following composition formula:

$$(Ba_{1-a-b-c}Ca_aSr_bM_c)O \cdot xMgO \cdot yAl_2O_3$$

wherein M is at least one element selected from the group consisting of Eu, Tm, Lu and Mn and a, b, c, x and y satisfy the following conditions:

0<a≦0.01,
0<b≦0.01,
0.01≦c≦0.3,
0≦x≦2.2, and
4.0≦y≦12.0.

The above-mentioned object of the present invention can be achieved also by applying, to PDP or a fluorescent lamp, a phosphor represented by the following composition formula:

$$(Ba_{1-a-b-c}Ca_aSr_bM_c)O \cdot xMgO \cdot y5Al_2O_3:A$$

to which at least one element selected from the element group A (Ce, Tb, Pr, Gd) is added, or a phosphor represented by the following composition formula:

$$(Ba_{1-a-b-c}Ca_aSr_bM_c)O \cdot xMgO \cdot y5Al_2O_3:B$$

to which at least one element selected from the element group B (La, Y, Sc, Ga, Si) is added, or a phosphor represented by the following composition formula:

$$(Ba_{1-a-b-c}Ca_aSr_bM_c)O \cdot xMgO \cdot y5Al_2O_3:A, B$$

to which elements belonging to element groups A and B are simultaneously added.

An improvement in the performance of PDP can be achieved by improving the discharge coefficient for generating a vacuum ultraviolet light for exciting the phosphor and the luminous efficiency for generating a visible light from the phosphor receiving the vacuum ultraviolet light.

Thus, the present inventors have prepared various blue- and green-colored light emitting phosphors capable of emitting a blue-colored light under an exciting light composed mainly of an ultraviolet light of 100 to 400 nm and represented by the following composition formulas:

$$(Ba_{1-a-b-c}Ca_aSr_bM_c)O \cdot xMgO \cdot yAl_2O_3$$

$$(Ba_{1-a-b-c}Ca_aSr_bM_c)O \cdot xMgO \cdot yAl_2O_3:A,$$

$$(Ba_{1-a-b-c}Ca_aSr_bM_c)O \cdot xMgO \cdot yAl_{2O3}:B, \text{ or}$$

$$(Ba_{1-a-b-c}Ca_aSr_bM_c)O \cdot xMgO \cdot yAl_2O_3:A, B$$

wherein M represents at least one element selected from the group consisting of Eu, Tm, Lu and Mn, and a, b, c, x and y satisfy the following conditions:

0<a≦0.01,
0<b≦0.01,
0.01≦c≦0.3,
0≦x≦2.2, and
4.0≦y≦12.0 and evaluated the light-emitting performances thereof under a vacuum ultraviolet light exciting the phosphor in PDP. As a result, it was found that rare earth elements such as Ce, Tb, Pr and Gd and the like are effective as the A in the above-mentioned composition formula and elements such as La, Y, Sc, Ga, Si and the like are effective as the B, and it was found that a higher luminance than that obtained from the prior green-colored light emitting phosphor $Zn_2SiO_4$:Mn and blue-colored light emitting phosphor $BaMgAl_{10}O_{17}$:Eu can be obtained by using these phosphors.

It was also found that rare earth elements such as Ce, Tb, Pr, Gd and the like are effective as the A in the composition formulas, and its preferable concentration is in the range of 0.0001 to 1% by weight as measured by high-frequency inductively-coupled plasma mass spectrum analysis (ICP-MS analysis). It was also found that elements such as La, Y, Sc, Ga, Si and the like are effective as the element B in the composition formulas, and its preferable concentration is in the range of 0.0001 to 5% by weight as measured by ICP-MS. The samples for the ICP-HS analysis were prepared by fusing an appropriate quantity of phosphor powder together with $Na_2CO_3$ and $H_3BO_3$ and then dissolving the fused mixture in hydrochloric acid.

An important factor determining the luminance lifetime of a blue-colored light emitting phosphor applied to devices, is the trap concentration in the phosphor. The inventors have removed the phosphors coated on a plasma display and evaluated the trap concentration thereof by the well known thermal light emission method (glow method). Herein, the phosphor removed from a PDP panel was used as the sample. The phosphor in a completed panel was removed from the rear substrate 20 by cutting the rear panel into a desired size and washing it in pure water by means of ultrasonic agitation. As another method for removal, it is also possible to remove only the phosphor from the rear substrate 20 by means of a brush-like jig. The phosphor powder collected in the above-mentioned manner was compressed and solidified on a metallic base plate or formed into a film on a base plate by the method of sedimentation coating or the like and then thoroughly dried, and used as a sample for the glow method. In this procedure, importance should be attached to reliable heat conduction between phosphor powder and base plate. Subsequently, the sample was mounted inside the vacuum chamber, cooled to the temperature of liquid nitrogen, and irradiated with vacuum ultraviolet light for about one hour. Then, the signal intensity of the blue-color emission only was measured, while elevating the temperature of sample at a constant rate of about 6 K/s. Herein was used Glass Filter B-46 (manufactured by Toshiba Corp.) which is a band pass filter having a center wavelength of 450 nm to 460 nm. It was found that a phosphor of which the thermal emission intensity ratio, namely the ratio of the signal intensity in the high temperature region (signal intensity appearing in the range of 300K to 600K as measured by glow method) to the signal intensity in low temperature region (signal intensity appearing at 100K to 200K as measured by glow method), is 1 or less in the thermal emission spectrum thereof is stable in luminance on the plasma display panel.

Based on the above-mentioned measurement of thermal emission spectrum, it was confirmed that the phosphor according to the present invention is markedly improved in the luminance lifetime and simultaneously in the shape of thermal emission spectrum.

It was also confirmed that the phosphor according to the present invention is applicable to fluorescent lamp.

In fluorescent lamps of tubular type and planar type, a rare gas resonance line similar to that used in PDP, or discharge light emission of Hg vapor, or a combination thereof is used as the excitation source of phosphor. A fluorescent lamp is obtained by mixing a plurality of phosphors and attaching the mixture to inside of lamp in place of separately applying the red-, green- and blue-colored light emitting phosphors, whereby an appropriate white color can be obtained.

Preferred embodiments of the present invention will be mentioned below.

(1) A phosphor emitting a visible light under an exciting light composed mainly of ultraviolet light of 100 nm to 400 nm, which is represented by the following composition formula:

$$(Ba_{1-a-b-c}Ca_aSr_bM_c)O.xMgO.yAl_2O_3$$

wherein M is at least one element selected from Eu, Tm, Lu and Mn, and a, b, c, x and y satisfy the following conditions:
 $0 < a \leq 0.01$,
 $0 < b \leq 0.01$,
 $0.01 \leq c \leq 0.3$,
 $0 \leq x \leq 2.2$, and
 $0 \leq y \leq 12.0$.

(2) A phosphor according to paragraph (1) emit-ting a visible light under an exciting light composed mainly of ultraviolet light of 100 nm to 400 nm, which is represented by the following composition formula:

$$(Ba_{1-a-b-c}Ca_aSr_bM_c)O.xMgO.yAl_2O_3$$

wherein M is at least one element selected from Eu, Tm, Lu and Mn, and a, b, c, x and y satisfy the following conditions:
 $0 < a \leq 0.005$,
 $0 < b \leq 0.005$,
 $0.01 \leq c \leq 0.3$,
 $0.6 \leq x \leq 1.7$, and
 $4.0 \leq y \leq 6.7$.

(3) A phosphor according to paragraph (1) emitting a blue-colored light under an exciting light composed mainly of ultraviolet light of 100 nm to 400 nm, which is represented by the following composition formula:

$$(Ba_{1-a-b-c}Ca_aSr_bM_c)O.xMgO.y5Al_2O_3$$

wherein M is at least one element selected from Eu, Tm and Lu, and a, b, c, x and y satisfy the following conditions:
 $0.00001 \leq a \leq 0.005$,
 $0.00001 \leq b \leq 0.005$,
 $0.01 \leq c \leq 0.3$,
 $0.6 \leq x \leq 1.7$, and
 $4.0 \leq y \leq 6.7$.

(4) A phosphor according to paragraph (1) to which element A is additionally added, which is represented by the following composition formula:

$$(Ba_{1-a-b-c}Ca_aSr_bM_c)O.xMgO.y5Al_2O_3:A$$

wherein A is at least one element selected from Ce, Tb, Pr and Gd.

(5) A phosphor according to paragraph (1) to which element B is additionally added, which is represented by the following composition formula:

$$(Ba_{1-a-b-c}Ca_aSr_bM_c)O.xMgO.y5Al_2O_3:B$$

wherein B is at least one element selected from La, Y, Sc, Ga and Si.

(6) A phosphor according to paragraph (1) to which element A and element B are additionally added simultaneously, which is represented by the following composition formula:

$$(Ba_{1-a-b-c}Ca_aSr_bM_c)O.xMgO.y5Al_2O_3:A,B$$

wherein A is at least one element selected from Ce, Tb, Pr and Gd, and B is at least one element selected from La, Y. Sc, Ga and Si.

(7) A phosphor according to paragraph (4), wherein said element A is added in an amount not smaller than 0.0001% by weight and not larger than 1% by weight as measured high-frequency inductively coupled plasma mass spectrum analysis (ICP-MS analysis).

(8) A phosphor according to paragraph (5), wherein said element B is added in an amount not smaller than 0.0001% by weight and not larger than 5% by weight as measured by ICP-MS analysis.

(9) A display device comprising at least a plasma-discharging display panel, wherein the phosphor layer emitting blue-colored or green-colored light among the red-, green- and blue-colored light emitting phosphor layers of said display panel is constituted of the following phosphor:
 a phosphor emitting a visible light under an exciting light composed mainly of an ultraviolet light of 100 nm to 400 nm, which is represented by the following composition formula:

$$(Ba_{1-a-b-c}Ca_aSr_bM_c)O.xMgO.yAl_2O_3$$

wherein M is at least one element selected from Eu, Tm, Lu and Mn and a, b, c, x and y satisfy the following conditions:
 $0 < a \leq 0.01$,
 $0 < b \leq 0.01$,
 $0.01 \leq c \leq 0.3$,
 $0 \leq x \leq 2.2$, and
 $4.0 \leq y \leq 12.0$.

(10) A display device according to paragraph (9), wherein said phosphor emits a visible light under an exciting light composed mainly of an ultraviolet light of 100 nm to 400 nm and is represented by the following composition formula:

$$(Ba_{1-a-b-c}Ca_aSr_bM_c)O.xMgO.yAl_2O_3$$

wherein M is at least one element selected from Eu, Tm, Lu and Mn and a, b, c, x and y satisfy the following conditions:
 $0 < a \leq 0.005$,
 $0 < b \leq 0.005$,
 $0.01 \leq c \leq 0.3$,
 $0.6 \leq x \leq 1.7$, and
 $4.0 \leq y \leq 6.7$.

(11) A display device according to paragraph (9), wherein said phosphor emits a blue-colored light under an exciting light composed mainly of an ultraviolet light of 100 nm to 400 nm and is represented by the following composition formula:

$$(Ba_{1-a-b-c}Ca_aSr_bM_c)O.xMgO.y5Al_2O_3$$

wherein M is at least one element selected from Eu, Tm and Lu and a, b, c, x and y satisfy the following conditions:

$0.00001 \leq a \leq 0.005$, $0.00001 \leq b \leq 0.005$, $0.01 \leq c \leq 0.3$, $0.6 \leq x \leq 1.7$, and $4.0 \leq y \leq 6.7$.

(12) A display device having at least a plasma-discharging display panel, wherein the thermal emission spectrum of the phosphor layer emitting a blue-colored light among the phosphor layers of said display panel emitting red-, green- and blue-colored lights has a ratio of the signal intensity in the high temperature range of 300K to 600K to the signal intensity in the low temperature range of 100K to 300K of 1 or less.

(13) A display device according to paragraph (12), wherein the phosphor layer emitting a blue-colored light emits a visible light under an exciting light composed mainly of an ultraviolet light of 100 nm to 400 nm and is represented by the following composition formula:

$(Ba_{1-a-b-c}Ca_aSr_bM_c)O \cdot xMgO \cdot yAl_2O_3$ wherein M is at least one element selected from Eu, Tm, Lu and Mn and a, b, c, x and y satisfy the following conditions:

$0 < a \leq 0.005$, $0 < b \leq 0.005$, $0.01 \leq c \leq 0.3$, $0.6 \leq x \leq 1.7$, and $4.0 \leq y \leq 6.7$.

(14) A display device according to paragraph (12), wherein the phosphor layer emitting a blue-colored light emits a blue-colored light under an exciting light composed mainly of an ultraviolet light of 100 nm to 400 nm and is represented by the following composition formula:

$(Ba_{1-a-b-c}Ca_aSr_bM_c)O \cdot xMgO \cdot y5Al_2O_3$ wherein M is at least one element selected from Eu, Tm and Lu, and a, b, c, x and y satisfy the following conditions:

$0.00001 \leq a \leq 0.005$, $0.00001 \leq b \leq 0.005$, $0.01 \leq c \leq 0.3$, $0.6 \leq x \leq 1.7$, and $4.0 \leq y \leq 6.7$.

(15) A light source comprising at least a fluorescent lamp in which a gas emitting an ultraviolet light including a wavelength of 400 nm or less upon discharge is sealed in a glass-made container and a driver circuit for driving said fluorescent lamp, wherein the phosphor layer of said fluorescent lamp is constituted of the following phosphor:

a phosphor emitting a visible light under an exciting light composed mainly of an ultraviolet light of 100 nm to 400 nm and represented by the following composition formula:

$(Ba_{1-a-b-c}Ca_aSr_bM_c)O \cdot xMgO \cdot yAl_2O_3$ wherein M is at least one element selected from Eu, Tm, Lu and Mn and a, b, c, x and y satisfy the following conditions:

$0 < a \leq 0.01$, $0 < b \leq 0.01$, $0.01 \leq c \leq 0.3$, $0 \leq x \leq 2.2$, and $4.0 \leq y \leq 12.0$.

(16) A light source according to paragraph (15), wherein said phosphor emits a visible light under an exciting light composed mainly of an ultraviolet light of 100 nm to 400 nm and is represented by the following composition formula:

$(Ba_{1-a-b-c}Ca_aSr_bM_c)O \cdot xMgO \cdot yAl_2O_3$ wherein M is at least one element selected from Eu, Tm, Lu and Mn and a, b, c, x and y satisfy the following conditions:

$0 < a \leq 0.005$, $0 < b \leq 0.005$, $0.01 \leq c \leq 0.3$, $0.6 \leq x \leq 1.7$, and $4.0 \leq y \leq 6.7$.

(17) A light source according to paragraph (15), wherein said phosphor emits a blue-colored light under an exciting light composed mainly of an ultraviolet light of 100 mm to 400 nm and is represented by the following composition formula:

$(Ba_{1-a-b-c}Ca_aSr_bM_c)O \cdot xMgO \cdot y5Al_2O_3$ wherein M is at least one element selected from Eu, Tm and Lu, and a, b, c, x and y satisfy the following conditions:

$0.00001 \leq a \leq 0.005$, $0.00001 \leq b \leq 0.005$, $0.01 \leq c \leq 0.3$, $0.6 \leq x \leq 1.7$, and $4.0 \leq y \leq 6.7$.

Next, the present invention is explained in more detail by referring to examples. Needless to say, the present invention is by no means limited by these examples.

EXAMPLE 1

In this example, the substitutive quantities a and b of Ca and Sr with which Ba of the blue-colored light emitting phosphor represented by $(Ba_{1-a-b-c}Ca_aSr_bM_c)O \cdot MgO \cdot 5Al_2O_3$ was replaced were varied in the ranges of $0 < a \leq 0.01$ and $0 < b \leq 0.01$.

$(Ba_{1-a-b-c}Ca_aSr_bM_c)O \cdot MgO \cdot 5Al_2O_3$ prepared by replacing a part of Ba of a blue-colored light emitting phosphor material with Ca and Sr and using Eu, Tm or Lu as M functioning as a luminous center were used as blue-colored light emitting phosphors. Herein, the quantities of Ca and Sr with which Ba was replaced were expressed by a and b, respectively, and concentrations of Ca and Sr were varied in the ranges of $0 < a \leq 0.01$ and $0 < b \leq 0.01$. Concentration c of luminous center M was fixed at 0.1 as a sum of Eu, Tm and Lu, provided that only the concentration of Eu was shown. The results are summarized in Table 1, wherein sample numbers 1–5 and 10 are cases in which the Ca/Sr ratio was kept constant, while sample numbers 6–9 are cases in which the ratio Ca/Sr was varied.

A phosphor was prepared by weighing out the starting materials according to the composition formula shown in Table 1, thoroughly pulverizing and mixing the materials, introducing the mixture into a crucible, and baking the mixture in the presence of air first at 1,500° C. for 2 hours and then at 1,300° C. for 2 hours. The starting materials used were $BaCO_3$, $CaCO_3$, $SrCO_3$, $Eu_2O_3$, $Tm_2O_3$, $Lu_2O_3$, $MgCO_3$ and $Al_2O_3$. After thoroughly dispersing the baked product, intensity of luminescence in the powdery state was measured and a mounting test was carried out.

Additionally speaking, it is also possible to carry out the same experiment as above by the use of starting compounds different from the above. The phosphors of this series of materials can be prepared according to various procedures of synthesis, and the method of synthesis mentioned herein is not limitative.

Luminous performance of each powdery sample was measured by filling each powder into a sample base plate, placing the base plate in a vacuum chamber, projecting a vacuum ultraviolet light (140–180 nm), and measuring the luminous intensity and luminous spectrum. The vacuum ultraviolet light used for the measurement was taken out from a heavy hydrogen lamp. The colors of light emitted from the powder samples were all blue, throughout all the runs.

Figure 2:
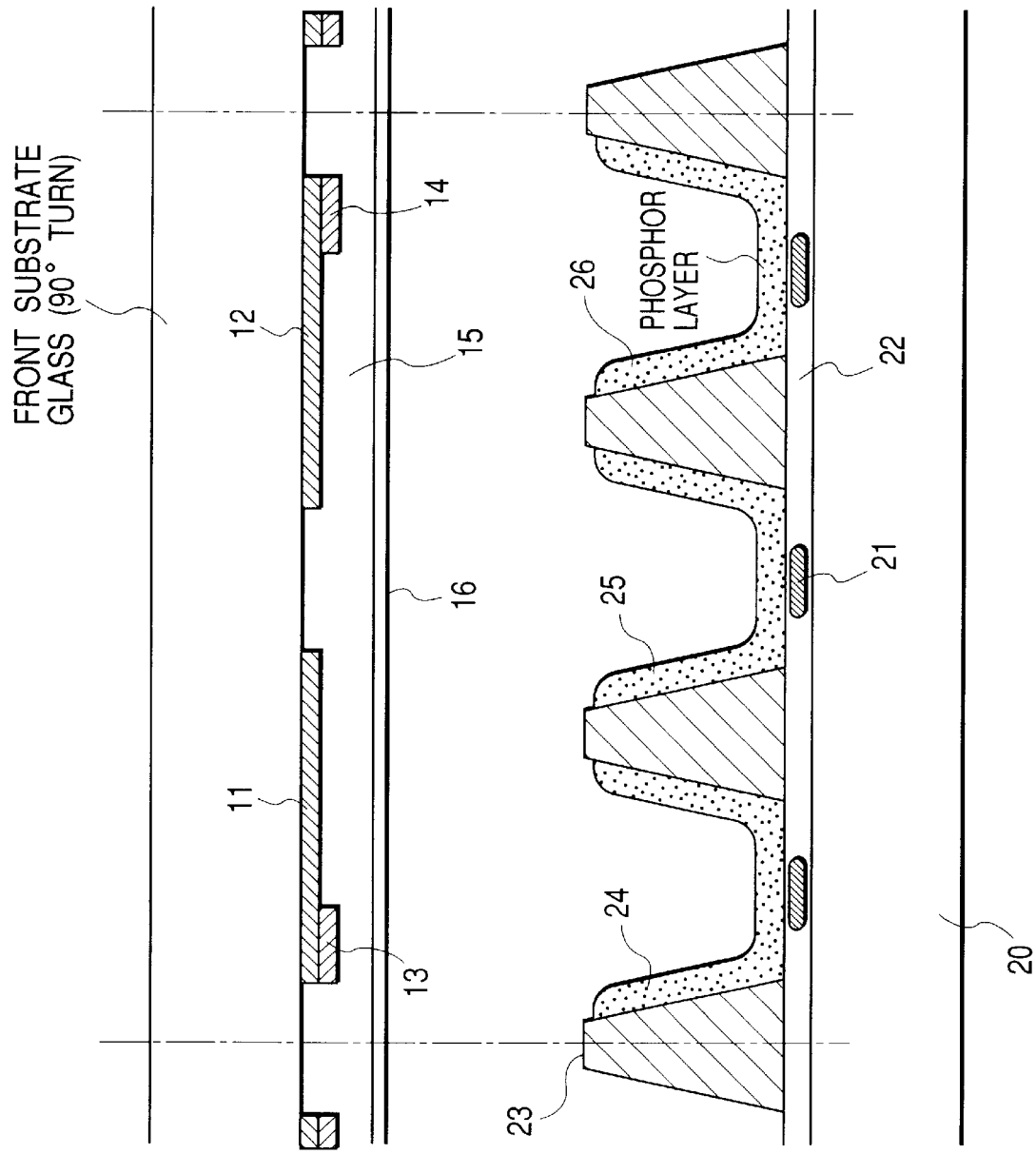
FIG. 2 is a sectional view illustrating the structure of one pixel constituting the plasma display panel according to Example 1 of the present invention.
Figure 7:
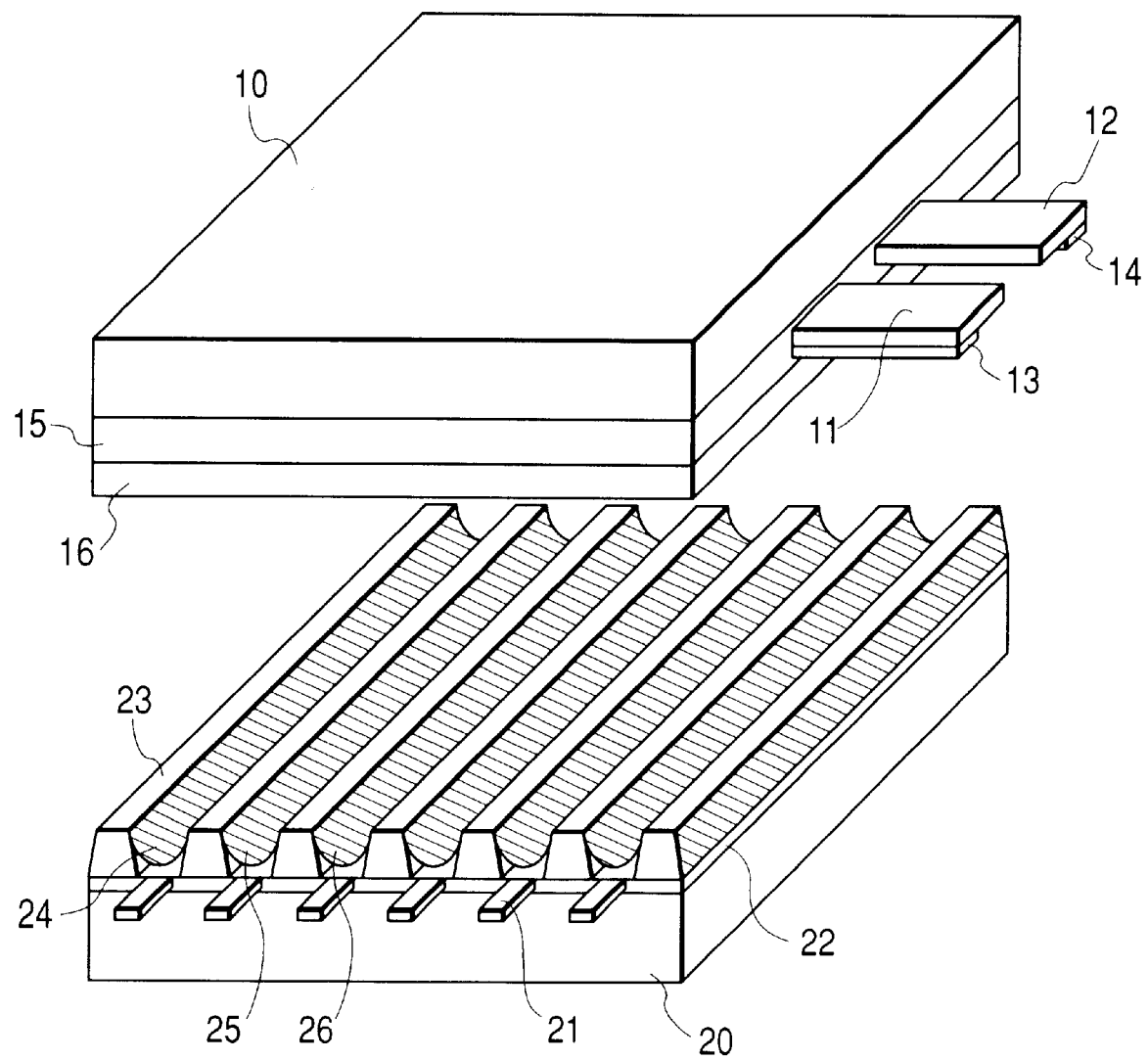
FIG. 7 is an exploded perspective view illustrating the structure of plasma display panel of a general surface-discharge type color plasma display system.

FIG. 1 is an exploded perspective view illustrating the structure of surface discharge type color PDP which is a plasma display system of Example 1; and FIG. 2 is a sectional view illustrating the structure of unit pixel of the PDP. Since structure of PDP of this example is roughly the same as that shown in the PDP of FIG. 7, detailed description thereof is omitted herein, provided that the phosphor layer 26 used an aluminic acid compound type phosphor to which a rare earth element europium (Eu) was added and activated as luminous center in the fundamental composition of the present invention, as a blue-colored phosphor. In FIG. 2, the front substrate 10 is shown in the state of being rotated by ±90 degrees.

In the PDP of surface discharge type color PDP, a discharge is made to occur by applying a negative voltage to the display electrode 12 (generally called "scanning electrode") and a positive voltage (positive as compared with the voltage applied to display electrode 12) to the address electrode 21 and display electrode 11, and thereby is formed a wall-charge supplementing the start of discharge between display electrodes 11 and 12 (this is called "writing-in"). When an appropriate reverse voltage is applied between the display electrodes 11 and 12 in this state, a discharge takes place in the discharge space between both the electrodes via the dielectric substance 15 and protective layer 16. When the polarity of voltage applied to display electrodes 11 and 12 is made reverse after completion of the discharge, a new discharge takes place and ends. By repeating the above-mentioned procedure, a continual pulse discharge is obtained (this is called "sustaining discharge" or "display discharge").

The PDP of this example was prepared by forming an address electrode 21 made of silver or the like and a dielectric substance layer 22 made of a glassy material on a rear substrate 20, forming a separation wall 23 from a separation wall material constituted of a similar glassy material into a film of great thickness by the method of printing and then blasting it by the use of a blasting mask, and then successively and stripe-wise forming each phosphor layer 24, 25 and 26 (red-, green- and blue-colored light emitting layers) on the separation wall 23 so as to cover the corresponding grooves existing between the separation walls 23.

The phosphor layers 24, 25 and 26 corresponded to red, green and blue colors, respectively. The red light-emitting phosphor particle material, green light emitting phosphor particle material and blue light-emitting phosphor particle material were used in amounts of 40, 30 and 30 parts by weight, respectively, which were mixed with 60, 56 and 70 parts by weight of vehicle, respectively, to prepare phosphor pastes. After coating each phosphor paste by screen printing method, drying and baking were carried out to vaporize the volatile components from the phosphor paste and burn off the organic matter to form each phosphor layer. The phosphor layers used in this example were all constituted from the corresponding phosphor particles of which central particle diameter was 3 $\mu$m. The phosphor materials used herein were phosphors according to the present invention, and fundamental compositions thereof were as follows: red phosphor $(Y, Gd)BO_3:Eu$, green phosphor $Zn_2SiO_4:Mn$, blue phosphor $BaMgAl_{10}O_{17}:Eu$.

Subsequently, the front glass substrate 10 on which display electrodes (11,12), bus electrodes (13,14), dielectric layer 15 and protective layer 16 were formed and rear glass substrate 20 were frit-sealed, the inner atmosphere was evacuated, the discharge gas was injected, and then the whole was sealed up. The PDP of this example had a size of 42 wide, a pixel number corresponding to VGA (852×480), and a pitch per unit pixel of 360 $\mu$m×1,080 $\mu$m. The PDP to which the present invention is applicable is not particularly limited in size, but the invention is applicable irregardless of the factors determining the PDP size such as screen size (about 15 to about 100 inches), resolution, pixel size, etc.

In the amounting test on PDP, the above-mentioned blue light-emitting phosphor (sample numbers 1–10) and the red and green light-emitting phosphors were used. Each of the red phosphor layer 24, green phosphor layer 25 and blue phosphor layer 26 was filled with their corresponding phosphor to prepare a plasma display system, and luminance and chromaticity point thereof were investigated. Herein, a blue light-emitting phosphor sample $(Ba_{0.9}Eu_{0.1})O \cdot MgO \cdot 5Al_2O_3$ to which neither Ca nor Sr was added was prepared as Comparative Example 1. The luminances in blue-color expression of the plasma display systems of this example were evaluated in terms of relative values, taking the luminance in blue-color expression of the plasma display system of Comparative Example 1 as 100.

Table 1 summarizes the results of evaluation on the samples of Nos. 1–10 and Comparative Example 1. In the samples of Nos. 1–5 and 10 where the Ca/Sr ratio was fixed at a constant value, the luminous intensity reached a maximum value at about 0.001, and it decreased beyond 0.01. In the samples of Nos. 6–9 where the Ca/Sr varied, an increase in luminous intensity could be confirmed as compared with Comparative Example 1 without exception. The blue light-emitting phosphors of sample numbers 1–9 (samples according to the present invention) to which Ca and Sr were added simultaneously were better than the sample of Comparative Example 1 in both of the luminance in powdery state and the luminance of PDP.

Based on these results, it can be said that the blue light-emitting phosphor materials studied in this example, represented by $(Ba_{1-a-b-c}Ca_aSr_bM_c)O \cdot MgO \cdot 5Al_2O_3$ in which Ba was partially replaced with Ca, Sr and Eu, Tm, Lu was used as M functioning as luminous center, gave relatively good results when a and b (concentrations of Ca and Sr replacing Ba) satisfied $0<a\leq 0.01$ and $0<b\leq 0.01$; and an especially good luminous characteristic property was exhibited when a and b satisfied $0<a\leq 0.005$ and $0<b\leq 0.005$.

As for the phosphor materials other than the blue light-emitting phosphor material, $(Y, Gd)BO_3:Eu$ was used as the red phosphor material and $Zn_2SiO_4:Mn$ was used as the green phosphor material in this example. However, the present invention is not limited to such a case, but the present invention is applicable also to phosphor materials other than those mentioned above or combination of phosphor materials other than those mentioned above, and further to cases of various particle diameters and sizes.

EXAMPLE 2

In this example were studied blue light-emitting phosphor materials represented by composition formula $(Ba_{1-a-b-c}$ $Ca_aSr_bM_c)O\cdot MgO\cdot 5Al_2O_3$ in which the value c, namely the concentration of luminous center M defined as the summed concentration of Eu, Tm and Lu, satisfied $0.01 \leq c \leq 0.4$. In Table 2, Nos. 11–20 are samples of this example.

The fundamental composition of the blue light-emitting phosphor material was $BaMgAl_{10}O_{17}$:Eu, and Ba was partially replaced with Ca, Sr, and Eu, Tm and Lu were used as M functioning as luminous center. That is, composition formula of the blue light-emitting phosphor material used herein was $(Ba_{1-a-b-c}Ca_aSr_bM_c)O\cdot MgO\cdot 5Al_2O_3$. In this example, the concentration c of luminous center M (summed concentration of Eu, Tm and Lu) was in the range satisfying $0.01 \leq c \leq 0.4$, provided that only the concentration of Eu was indicated. The quantities of Ca and Sr replacing Ba were in the ranges satisfying $o < a \leq 0.005$ and $o < b \leq 0.005$.

The phosphors were synthesized and evaluated in the same manner as in Example 1. All the powdery samples of this example emitted a blue-colored light. The mounting test onto PDP was carried out according to the same procedure as mentioned in Example 1.

Table 2 illustrates the results of evaluation of the samples of Nos. 11–20 and Comparative Example 1. The influence of the luminous center concentration on the phosphors of the present invention to which Ca and Sr were simultaneously added was investigated. In the blue light-emitting phosphor materials of sample numbers 11–20, the luminous intensity in the powdery state was always higher than that in Comparative Example 1 to which neither Ca nor Sr was added. In the sample of No. 16 having a luminous center concentration of 0.4, PDP luminous intensity decreased. In the sample of No. 20, both powder luminous intensity and PDP luminous intensity decreased.

Based on these results, it has become apparent that the blue light-emitting phosphor materials of the composition formula $(Ba_{1-a-b-c}Ca_aSr_bM_c)O\cdot MgO\cdot 5Al_2O_3$ in which Ba is partially replaced with Ca, Sr and Eu, Tm, Lu are used as the luminous center M exhibit a good luminous characteristic property when the concentration c of luminous center M (Eu, Tm, Lu) satisfies $0.01 \leq c \leq 0.3$.

As for the phosphor materials other than the blue light-emitting phosphor material, $(Y, Gd)BO_3$:Eu was used as the red phosphor material and $Zn_2SiO_4$:Mn was used as the green phosphor material in this example, in the same manner as in Example 1. However, the present invention is not limited to such a case, but the present invention is applicable also to phosphor materials other than those mentioned above or combination of phosphor materials other than those mentioned above, and further to cases of various particle diameters and sizes.

EXAMPLE 3

In this example, the composition ratio x of MgO and the composition ratio y of $Al_2O_3$ in the blue light-emitting phosphor material $(Ba_{1-a-b-c}Ca_aSr_bM_c)O\cdot xMgO\cdot yAl_2O_3$ were studied. In Table 3, the samples of Nos. 21–25 correspond to the cases in which composition ratio of MgO is 1 or less, and Nos. 26–30 correspond to the cases in which composition ratio of MgO is more than 1.

In this example, blue light-emitting phosphor materials $(Ba_{1-a-b-c}Ca_aSr_bM_c)O\cdot xMgO\cdot yAl_2O_3$ in which Ba was partially replaced with Ca, Sr and Eu, Tm, Lu were used as the luminous center M were used. Taking the composition ratio of Ba site as unity, the composition ratio of MgO (x) and that of $Al_2O_3$ (y) were investigated in the range of $0 \leq x \leq 2.2$ and $2.4 \leq y \leq 8.8$. The quantities of Ca and Sr replacing Ba, namely a and b, were in the range of $0 < a \leq 0.005$ and $o < b \leq 0.005$. The composition formulas of blue light-emitting phosphor materials and the results of evaluation thereof are summarized in Table 3.

The phosphors were synthesized and evaluated in the same manner as in Example 1.

In Table 3 are summarized the results of evaluation of the samples of Nos. 21–30 and Comparative Example 2. The influence of x (composition ratio of MgO) and y (composition ratio of $Al_2O_3$) on the phosphors of the present invention to which Ca and Sr were simultaneously added were investigated. As compared with the phosphor of Comparative Example 2 containing neither Ca nor Sr, all the blue light-emitting phosphor materials of Nos. 21–30 were higher in the powder luminance intensity.

In a PDP mounting test of these phosphor materials (Nos. 21–30), the results obtained were similar to the results of evaluation of powder luminance intensity.

Based on these results, it has become apparent that the blue light-emitting phosphor materials represented by $(Ba_{1-a-b-c}Ca_aSr_bM_c)O\cdot xMgO\cdot yAl_2O_3$ in which Ba is partially replaced with Ca, Sr and Eu, Tm, Lu are used as M functioning as luminous center exhibits a good luminous characteristic property when the composition ratio of MgO (x) and composition ratio of $Al_2O_3$ (y) satisfy $0 \leq x \leq 2.2$ and $4 \leq y \leq 8.8$, respectively, taking the composition of Ba in the composition formula (including the quantities corresponding to the replacing elements) as unity.

As for the phosphor materials other than the blue light-emitting phosphor material, $(Y, Gd)BO_3$:Eu was used as the red phosphor material and $Zn_2SiO_4$:Mn was used as the green phosphor material in this example, in the same manner as in Example 1. However, the present invention is not limited to such a case, but the present invention is applicable also to phosphor materials other than those mentioned above or combination of phosphor materials other than those mentioned above, and further to cases of various particle diameters and sizes.

EXAMPLE 4

In this example, composition ratio of MgO (x) and composition ratio of $Al_2O_3$ (y) of a green light emitting phosphor material represented by $(Ba_{1-a-b-c}Ca_aSr_bM_c)O\cdot xMgO\cdot yAl_2O_3$ were studied. In Table 4, the samples of Nos. 31–34 correspond to the case where composition ratio of MgO is 1 or less.

In this example, $(Ba_{1-a-b-c}Ca_aSr_bM_c)O\cdot xMgO\cdot yAl_2O_3$ in which Ba was partially replaced with Ca, Sr and Eu, Tm, Lu or Mn was used as M functioning as luminous center was used as a green light-emitting phosphor material. Even in Sample No. 31 to which Eu and Mn were simultaneously added, Mn showed an intense luminescence to emit a green-colored light. The cases in which composition ratio of MgO (x) and composition ratio of $Al_2O_3$ (y) were in the range of $0 \leq x \leq 1$ and $6 \leq y \leq 12.0$ were investigated, taking the composition ratio of Ba site as unity. The quantities of Ca and Sr replacing Ba were made to fall in the range of $o < a \leq 0.005$ and $0 < b \leq 0.005$, respectively.

The phosphors were synthesized and evaluated in the same manner as in Example 1.

In Table 4 are summarized the results of evaluation of the samples of Nos. 31–34 and Comparative Example 3. The influence of x (composition ratio of MgO) and y (composition ratio of $Al_2O_3$) on the phosphors of the present invention to which Ca and Sr were simultaneously added was investigated. As compared with the phosphor of Comparative Example 3 containing neither Ca nor Sr, all the green light emitting phosphor materials of Nos. 31–34 were higher in the powder luminance intensity.

In a PDP mounting test of these phosphor materials (Nos. 31–34), the results obtained were similar to the results of evaluation of powder luminance intensity.

Based on these results, it has become apparent that the green phosphor materials represented by $(Ba_{1-a-b-c}Ca_aSr_bM_c)O \cdot xMgO \cdot yAl_2O_3$ in which Ba is partially replaced with Ca, Sr and Eu, Tm, Lu or Mn is used as M functioning as luminous center exhibits a good luminous characteristic property when the composition ratio of MgO (x) and composition ratio of $Al_2O_3$ (y) satisfy $0 \leq x \leq 1$ and $6 \leq y \leq 12.0$, respectively, taking the composition of Ba in the composition formula (including the quantities corresponding to the replacing elements) as unity.

As for the phosphor materials other than the green phosphor material, $(Y, Gd)BO_3$:Eu was used as the red light emitting phosphor material and the material of Comparative Example 1 was used as the blue light-emitting phosphor material in this example, in the same manner as in Example 1. However, the present invention is not limited to such a case, but the present invention is applicable also to phosphor materials other than those mentioned above or combination of phosphor materials other than those mentioned above, and further to cases of various particle diameters and sizes.

EXAMPLE 5

In this example, phosphors represented by the composition formula $(Ba_{1-a-b-c}Ca_aSr_bM_c)O \cdot xMgO \cdot y5Al_2O_3$:A to which at least one element selected from element group A is added as an impurity were studied.

The kind of impurity A and the concentration of impurity A shown in the composition formula $(Ba_{1-a-b-c}Ca_aSr_bM_c)O \cdot xMgO \cdot yAl_2O_3$:A in which Ba was partially replaced with Ca, Sr and Eu, Tm, Lu was used as the M functioning as luminous center were investigated. It was found that powder luminous intensity increased when rare earth element Ce, Tb, Pr or Gd was used as the impurity A. Then, the concentration of each impurity was varied in the range of 0.0001% by weight to 1% by weight. When the impurity was Ce or Tb, a good performance was obtained in nearly whole range. When the impurity was other element, namely Pr or Gd, a good result was obtained in the concentration range of 0.001% by weight to 0.1% by weight. A PDP mounting test was carried out on all the impurities at their most representative concentration. In Table 5, composition formulas of the blue light-emitting phosphor materials to which impurity was added, concentrations of impurity A and results of measurement of PDP luminous intensity are summarized.

Rare earth element (Ce, Tb, Pr or Gd) was additionally added as an impurity to a phosphor of the present invention to which Ca and Sr had been added simultaneously, and the effect of the addition of the impurity was studied. In the blue light-emitting phosphor materials of sample numbers 35–46, an increase in powder luminous intensity and at the same time a similar increase in PDP luminous intensity were observed, as compared with the sample of Comparative Example 4 to which Ca, Sr was added and no rare earth element was added, except for the sample of No. 42. The sample No. 42 showed a powder luminous intensity of 102, based on that of the sample of Comparative Example 4 (100).

Based on these results, it has been confirmed that, in a blue light-emitting phosphor material represented by $(Ba_{1-a-b-c}Ca_aSr_bM_c)O \cdot xMgO \cdot yAl_2O_3$:A prepared by adding an impurity to a phosphor material represented by $(Ba_{1-a-b-c}Ca_aSr_bM_c)O \cdot xMgO \cdot yAl_2O_3$ in which Ba is partially replaced with Ca, Sr and Eu, Tm or Lu is used as M functioning as the luminous center, Ce, Tb, Pr and Gd effectively function as the impurity and the powder luminous intensity increases when the concentration of the impurity is in the range of 0.0001% by weight-to 1% by weight. In a PDP mounting test, too, an increase in luminous intensity has been confirmed.

As for the phosphor materials other than the blue light-emitting phosphor material, $(Y, Gd)BO_3$:Eu was used as the red phosphor material and $Zn_2SiO_4$:Mn was used as the green phosphor material in this example, in the same manner as in Example 1. However, the present invention is not limited to such a case, but the present invention is applicable also to phosphor materials other than those mentioned above or combination of phosphor materials other than those mentioned above, and further to cases of various particle diameters and sizes.

EXAMPLE 6

In this example, phosphors represented by composition formula $(Ba_{1-a-b-c}Ca_aSr_bM_c)O \cdot MgO \cdot y5Al_2O_3$:B to which at least one element selected from element group B (La, Y, Sc, Ga and Si) is added as an impurity were studied.

The kind of impurity B and the concentration of impurity B shown in the composition formula $(Ba_{1-a-b-c}Ca_aSr_bM_c)O \cdot xMgO \cdot yAl_2O_3$:B in which Ba was partially replaced with Ca, Sr and Eu, Tm, Lu was used as the M functioning as luminous center were investigated. It was found that powder luminous intensity increased when element La, Y, Sc, Ga or Si was used as the impurity B. Then, the concentration of each impurity was varied in the range of 0.0001% by weight to 5% by weight. When the impurity was La or Y, a good performance was obtained in nearly whole range. When the impurity was other element, namely Sc, Ga or Si, a good result was obtained in the concentration range of 0.001% by weight to 1% by weight. A PDP mounting test was carried out on all the impurities at their most representative concentration. In Table 6, composition formulas of the blue light-emitting phosphor materials to which impurity was added, concentrations of impurity B and results of measurement of PDP luminous intensity are summarized.

The impurity element (La, Y, Sc, Ga or Si) was additionally added to a phosphor of the present invention to which Ca and Sr had been added simultaneously, and the influence of the addition of impurity was investigated. In the blue light-emitting phosphor materials of sample numbers 47–55, an increase in powder luminous intensity and a simultaneous increase in PDP luminous intensity were observed, as compared with the case of Comparative Example 4 to which Ca and Sr were added and no rare earth impurity was added.

Based on these results, it has been confirmed that, in a blue light-emitting phosphor material represented by $(Ba_{1-a-b-c}Ca_aSr_bM_c)O \cdot xMgO \cdot yAl_2O_3$:B prepared by adding an impurity to a phosphor material represented by $(Ba_{1-a-b-c}Ca_aSr_bM_c)O \cdot xMgO \cdot yAl_2O_3$ in which Ba is partially replaced with Ca, Sr and Eu, Tm or Lu is used as M functioning as the luminous center, La, Y, Sc, Ga and Si effectively function as the impurity and the powder luminous intensity increases when the concentration of the impurity is in the range of 0.0001% by weight to 5% by weight. In a PDP mounting test, too, an increase in luminous intensity has been confirmed.

As for the phosphor materials other than the blue light-emitting phosphor material, $(Y, Gd)BO_3$:Eu was used as the red phosphor material and $Zn_2SiO_4$:Mn was used as the green phosphor material in this example, in the same manner as in Example 1. However, the present invention is not limited to such a case, but the present invention is applicable also to phosphor materials other than those mentioned above or combination of phosphor materials other than those mentioned above, and further to cases of various particle diameters and sizes.

EXAMPLE 7

In this example, phosphors represented by composition formula $(Ba_{1-a-b-c}Ca_aSr_bM_c)O.xMgO.y5Al_2O_3$:A, B to which elements belonging to element groups A and B are simultaneously added as impurities were studied.

The combination of the simultaneously added impurity elements A and B (co-activating elements) and the concentrations thereof in the composition formula $(Ba_{1-a-b-c}Ca_aSr_bM_c)O.xMgO.yAl_2O_3$:A, B in which Ba was partially replaced with Ca, Sr and Eu, Tm, Lu was used as the M functioning as luminous center were investigated. Phosphors were synthesized by using Ce, Tb, Pr or Gd as impurity element A and La, Y, Sc, Ga or Si as impurity element B and varying the combination of the impurity elements A, B at varied concentrations. Ten combinations showing a powder luminous intensity of 105 or more were selected (sample numbers 56–65) from the synthesized phosphors, on which a PDP mounting test was carried out. Composition formulas of the blue light-emitting phosphor materials to which the impurities were added, concentrations of the impurities A, B, and the results of the measurement of PDP luminous intensity are summarized in Table 7. It has been found that PDP luminous intensity increased so as to correspond to the increase in powder luminous intensity in all the samples.

The impurity element A (Ce, Tb, Pr or Gd) and impurity element B (La, Y, Sc, Ga or Si) were simultaneously added to a phosphor of the present invention to which Ca and Sr had already been added simultaneously, and the influence of the addition of the impurities was investigated. In the blue light-emitting phosphor materials of sample numbers 56–65, an increase in powder luminous intensity and a simultaneous increase in PDP luminous intensity were observed, as compared with the case of Comparative Example 6 to which Ca and Sr were added and no impurity was added.

Based on these results, it has been confirmed that, in a blue light-emitting phosphor material represented by $(Ba_{1-a-b-c}Ca_aSr_bM_c)O.xMgO.yAl_2O_3$:A, B prepared by adding impurities to a phosphor material represented by $(Ba_{1-a-b-c}Ca_aSr_bM_c)O.xMgO.yAl_2O_3$ in which Ba is partially replaced with Ca, Sr and Eu, Tm or Lu is used as M functioning as the luminous center, impurity elements A (Ce, Tb, Pr, Gd) and impurity elements B (La, Y, Sc, Ga and Si) effectively act as the impurities and the powder luminous intensity increases when the concentration of the impurity is in the range of 0.0001% by weight to 5% by weight. In a PDP mounting test, too, an increase in luminous intensity has been confirmed.

As for the phosphor materials other than the blue light-emitting phosphor material, (Y, Gd)$BO_3$:Eu was used as the red phosphor material and $Zn_2SiO_4$:Mn was used as the green phosphor material in this example, in the same manner as in Example 1. However, the present invention is not limited to such a case, but the present invention is applicable also to phosphor materials other than those mentioned above or combination of phosphor materials other than those mentioned above, and further to cases of various particle diameters and sizes.

EXAMPLE 8

In this example, the concentrations of impurities in the phosphors of Examples 5, 6 and 7 were investigated by high-frequency induction combined plasma mass analysis (ICP-MS analysis).

The samples subjected to the measurement included phosphors of sample numbers 35–46 represented by the composition formula $(Ba_{1-a-b-c}Ca_aSr_bM_c)O.xMgO.y5Al_2O_3$:A to which at least one element selected from element group A (Ce, Tb, Pr, Gd) was added as impurity, phosphors of sample numbers 47–55 represented by the composition formula $(Ba_{1-a-b-c}Ca_aSr_bM_c)O.xMgO.y5Al_2O_3$:B to which at least one element selected from element group B (La, Y, Sc, Ga, Si) was added as impurity, and phosphors of sample numbers 56–65 represented by the composition formula $(Ba_{1-a-b-c}Ca_aSr_bM_c)O.xMgO.y5Al_2O_3$:A, B to which at least the elements of the impurity groups A and B were simultaneously added as impurities. As the comparative sample, the blue light-emitting phosphor sample of Comparative Example 1 to which neither Ca nor Sr was added, represented by $(Ba_{0.9}Eu_{0.1})O.MgO.5Al_2O_3$, was used.

An appropriate quantity of each sample was fused together with $Na_2CO_3$ and $H_3BO_3$, dissolved in hydrochloric acid, and then subjected to ICP-MS analysis.

In the samples of Nos. 35–46, the analytical results roughly corresponded to the concentration of impurity added, and each of the impurities Ce, Tb, Pr and Gd was present in an amount of 0.0001–1% by weight. In addition, presence of 0.0001 of Ca and 0.0001 of Sr, both expressed in terms of molar ratio, was revealed, and presence of Eu, Tm and Lu in an amount of about 0.1 mol, as a summed concentration, was revealed.

In the samples of Nos. 47–55, too, the analytical results roughly corresponded to the concentration of impurity added, and each of the impurities La, Y, Sc, Ga and Si was present in an amount of 0.0001–5% by weight. In addition, presence of 0.0001 of Ca and 0.005 of Sr, both expressed in terms of molar ratio, was revealed, and presence of Eu, Tm and Lu in an amount of about 0.05 mol, as a summed concentration, was revealed.

In the samples of Nos. 56–65, the influence of simultaneous addition was not observed, and the analytical results roughly corresponded to the concentrations of the impurities added.

Based on the results mentioned above, it was found that rare earth elements such as Ce, Tb, Pr and Gd are effective as the impurity element A in the composition formula, and preferable concentration thereof is 0.0001% by weight to 1% by weight. It was also found that La, Y, Sc, Ga and Si are effective as the impurity element B in the composition formula, and preferable concentration thereof is 0.0001 to 5% by weight.

EXAMPLE 9

In this example, the data of luminance lifetime of plasma display device was investigated on the blue light-emitting phosphor materials among the phosphor samples Nos. 1–65. The blue light-emitting phosphor used included phosphors represented by $(Ba_{1-a-b-c}Ca_aSr_bM_c)O.xMgO.yAl_2O_3$ in which Ba was partially replaced with Ca, Sr and Eu, Tm, Lu was used as M functioning as luminous center wherein the composition ratios a, b, c, x and y satisfied $0<a\leq0.005$, $0<b\leq0.005$, $0.01\leq c\leq0.3$, $0\leq x\leq2.2$ and $4.0\leq y\leq12.0$; phosphors represented by composition formula $(Ba_{1-a-b-c}Ca_aSr_bM_c)O.xMgO.y5Al_2O_3$:A prepared by adding at least one element selected from element group A (Ce, Tb, Pr, Gd) as an impurity to the above-mentioned phosphor; phosphors represented by composition formula $(Ba_{1-a-b-c}Ca_aSr_bM_c)O.xMgO.y5Al_2O_3$:B prepared by adding at least one element selected from element group B (La, Y, Sc, Ga, Si) as an impurity to the above-mentioned phosphor; and phosphors represented by composition formula $(Ba_{1-a-b-c}Ca_aSr_bM_c)O.xMgO.y5Al_2O_3$:A, B prepared by adding elements of element group A and element group B as impurities simultaneously to the above-mentioned phosphor. As the comparative phosphor sample, the blue light-emitting phosphor of Comparative Example 1 represented by $(Ba_{0.9}Eu_{0.1})O.MgO.5Al_2O_3$ to which neither Ca nor Sr was added was used.

It has been confirmed that the lifetime of luminance is improved in any of the blue light-emitting phosphors of sample numbers 1–65. As a main cause for this improvement of luminance lifetime, a lowered concentration of deep trap level in the phosphor can be thought out. Thus, the phosphor film mounted on PDP was removed, and the state of trap in this phosphor film was investigated by the thermal emission method.

The trap was evaluated by the well known thermal light emission method (glow method). The samples used herein were phosphors removed from a PDP panel. A phosphor in a manufactured panel was removed by dismantling the panel, cutting the rear base plate 20 into an arbitrary size, washing the cut pieces with pure water ultrasonically, and removing the phosphor from the piece of rear panel 20. As another method for removing, a method of removing only the phosphors from rear base plate 20 by means of a brush-like jig can also be referred to. The phosphor powder thus collected was again formed into a uniform phosphor film on a metallic base plate by the sedimentation method. As a simple method for formation of phosphor film, a method of compressing and solidifying the powder can also be referred to. After thoroughly drying the phosphor film formed on the base plate, it was used as a sample for the thermal light emission measurement. It was important at this time to assure the heat conduction between phosphor powder and base plate. Subsequently, the sample was mounted inside of a vacuum chamber, cooled to the temperature of liquid nitrogen, and irradiated with vacuum ultraviolet light for about one hour, after which the signal intensity of blue light emission only was measured while elevating the sample temperature at a constant rate of about 6K/s. In this example, Glass Filter B-46 (manufactured by Toshiba Corp., center wavelength 450 nm to 460 nm) was used.

In considering the signal intensity, the whole temperature region was divided into high temperature region (higher than 300K) and low temperature region (lower than 300K), and signal intensity was compared between the two temperature regions. It is desirable that the signal intensity in the high temperature region is smaller than that in the low temperature region. Further, it is also desirable that the signal intensity in the low temperature region is as small as possible.

Figure 8:
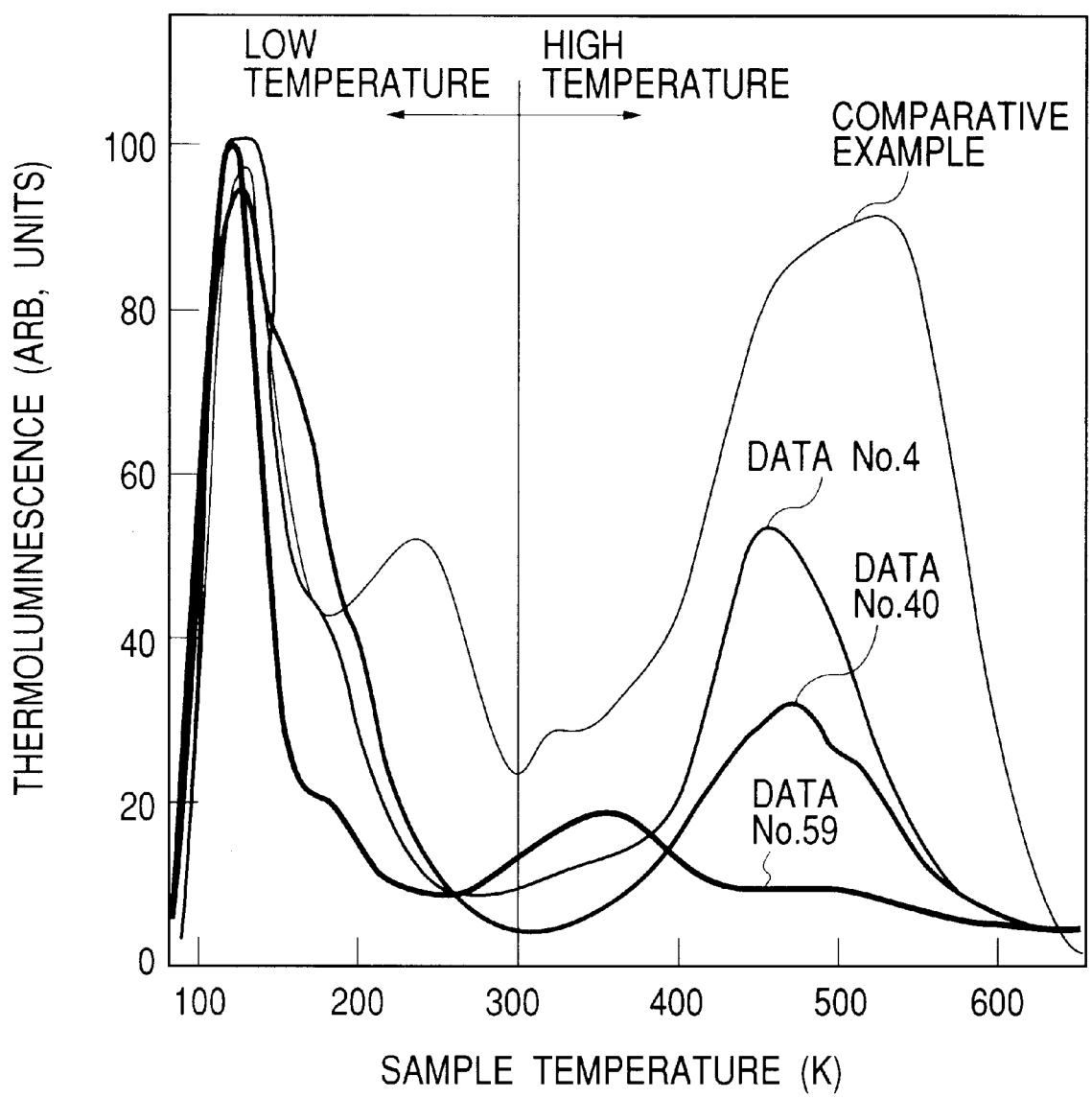
FIG. 8 is a graph illustrating the results of evaluation of thermal light emitting spectra in the phosphors of Sample Nos. 4, 40, 59 and Comparative Example 1.

In this example, the trap was evaluated by the thermal light emission method on the phosphors of sample numbers 4, 40, 59 and Comparative Example 1. FIG. 8 illustrates the thermal light emission spectra thus obtained. In the phosphor of Comparative Example 1, the ratio of signal intensity in high temperature region (signal intensity appearing in the temperature range of 300K to 600K as measured by thermal light emission method) to the signal intensity in low temperature region (signal intensity appearing in the temperature region of 100K to 300K as measured by thermal light emission method), namely the thermal light emission ratio, was 1.7. On the other hand, the thermal light emission intensity ratios for the sample numbers 4, 40 and 59 were 1.0, 0.6 and 0.6, respectively, none of which exceeded unity.

The above-mentioned results indicate that the lifetime of luminance has a relation to the thermal light emission intensity ratio.

EXAMPLE 10

Figure 3:
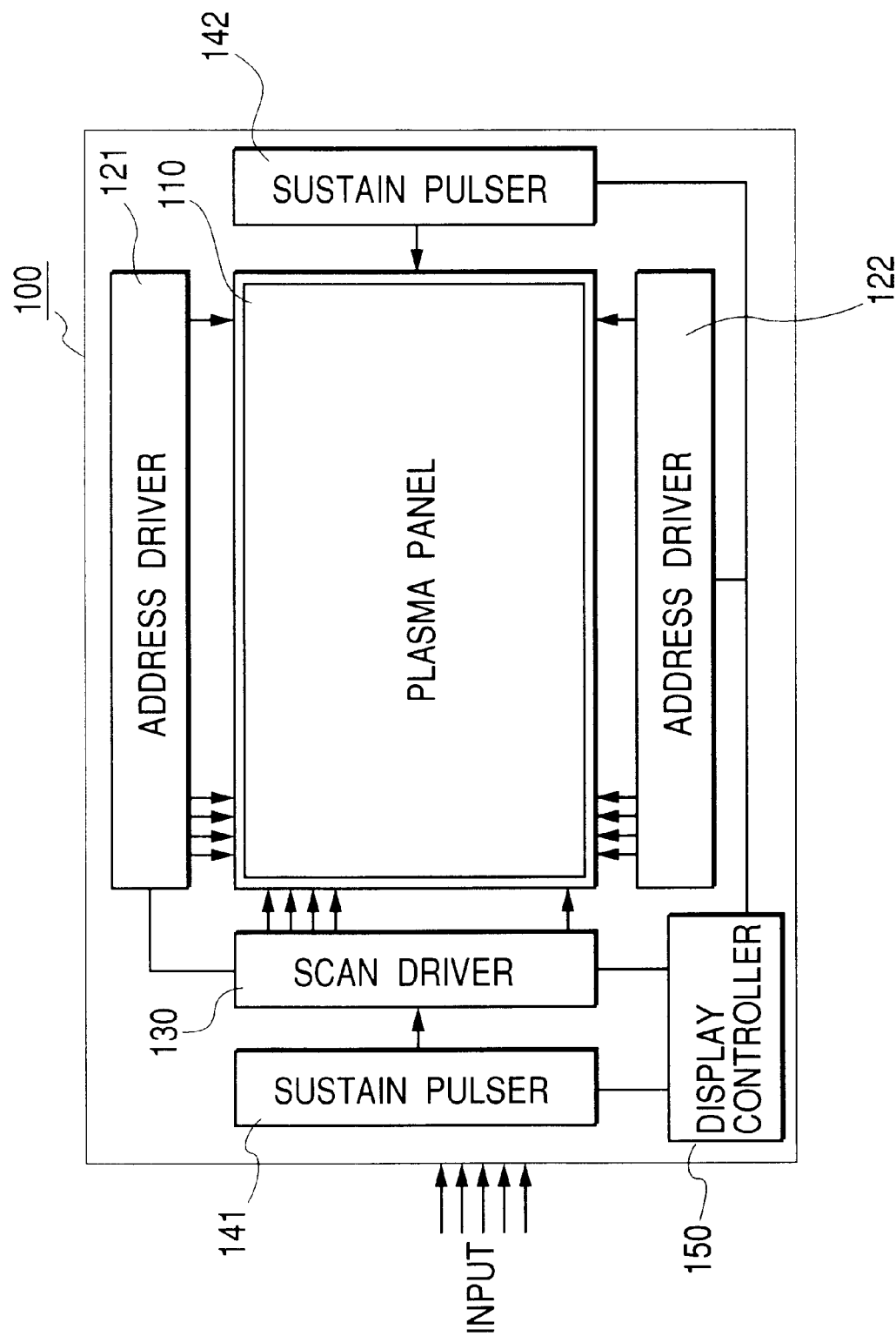
FIG. 3 is a block diagram illustrating the outlined structure of the plasma display panel part according to Example 10 of the present invention.

In this example, the display systems using PDP according to each of the above-mentioned examples will be described. FIG. 3 is a block diagram illustrating the outlined structure of plasma display panel part 100. Plasma display panel part 100 is constituted from PDP 110, data driver circuits (121, 122), scanning driver circuit 130, high tension pulse generating circuit (141, 142) and control circuit 150 for controlling the above-mentioned circuits.

PDP 110 is the PDP described in each of the foregoing examples, which is driven according to the dual scanning mode in which an image screen is divided into upper half and lower half, and they are simultaneously driven. For this purpose, two data driver circuits (121, 122) are provided on the longer side of PDP 110, and the two data driver circuits drive the upper and lower address electrodes 21 simultaneously.

On the shorter side of PDP 110 is provided a scanning driver circuit 130, which drives the display electrode 22. The high tension pulse generating circuit 141 generates high tension pulse which is input via scanning driver circuit 130 to display electrode 12.

On the other shorter side of PDP 110 is provided a high tension pulse generating circuit 142, which forms a high tension pulse to drive the display electrode 11.

Figure 4:
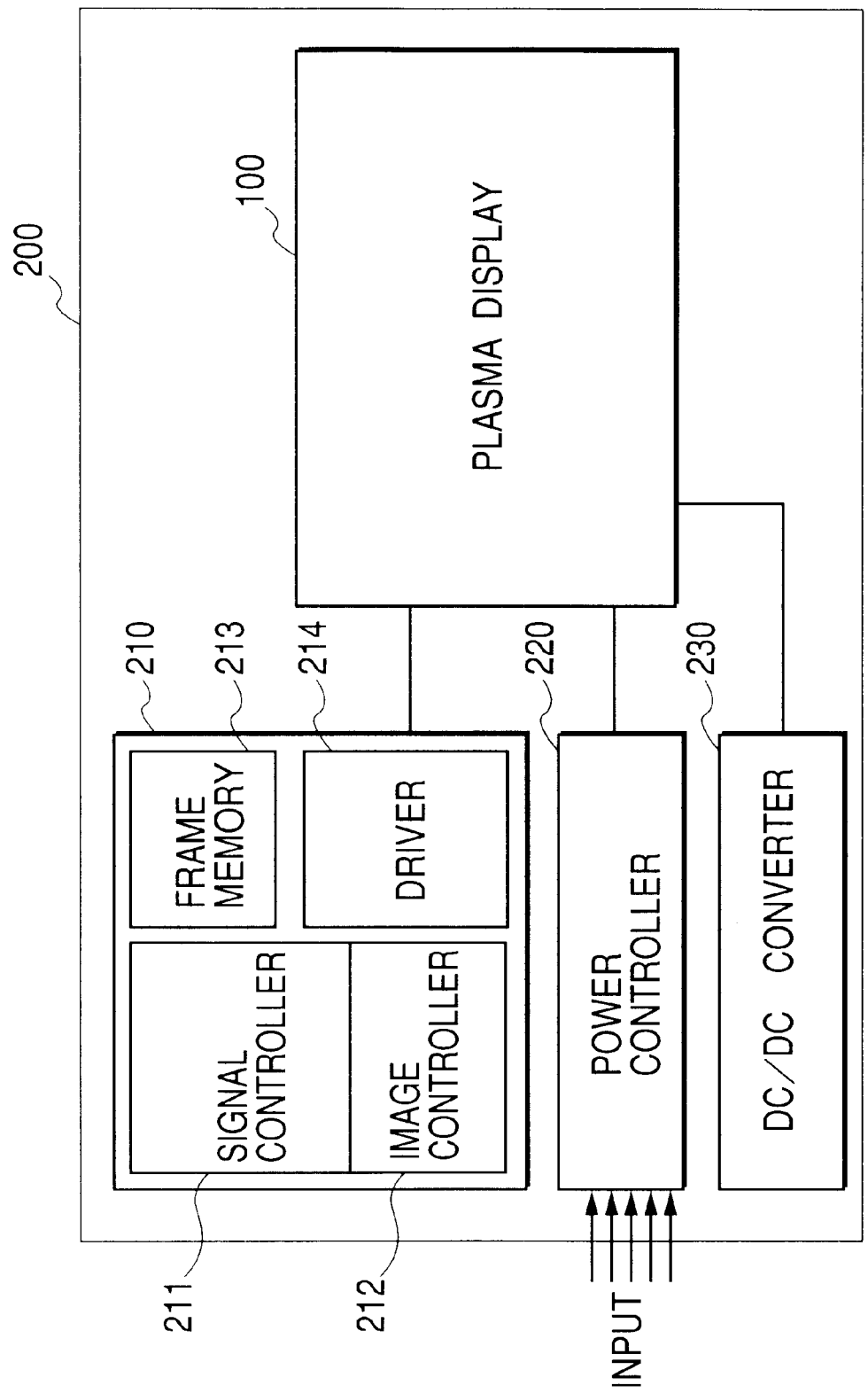
FIG. 4 is a block diagram illustrating the outlined structure of one example of the plasma display module equipped with the plasma display panel part shown in FIG. 3.

FIG. 4 is a block diagram illustrating the outlined structure of one example of plasma display module 200 provided with the plasma display panel part 100 shown in FIG. 3. As shown in FIG. 4, plasma display module 200 is composed of a signal conditioning circuit 210 constituted of input signal conditioning circuit 211, image quality improving conditioning circuit 212, frame memory 213, and scan/data driver controlling circuit 214; and a power controlling circuit 220; a high voltage source circuit 230; and a plasma display panel part 100. The input image signal input into the plasma display module 200 is subjected to signal treatments such as γ-correction, etc. in the input signal treating circuit 211 and image quality improving treatment circuit 212 and then stored into frame memory 213. In a case where the input image signal is an analogue signal, it is converted to digital data in the input signal treating circuit 211.

Scan/data driver controlling circuit 214 controls and drives the data driver circuits (121, 122) and scanning driver circuit 130.

Figure 5:
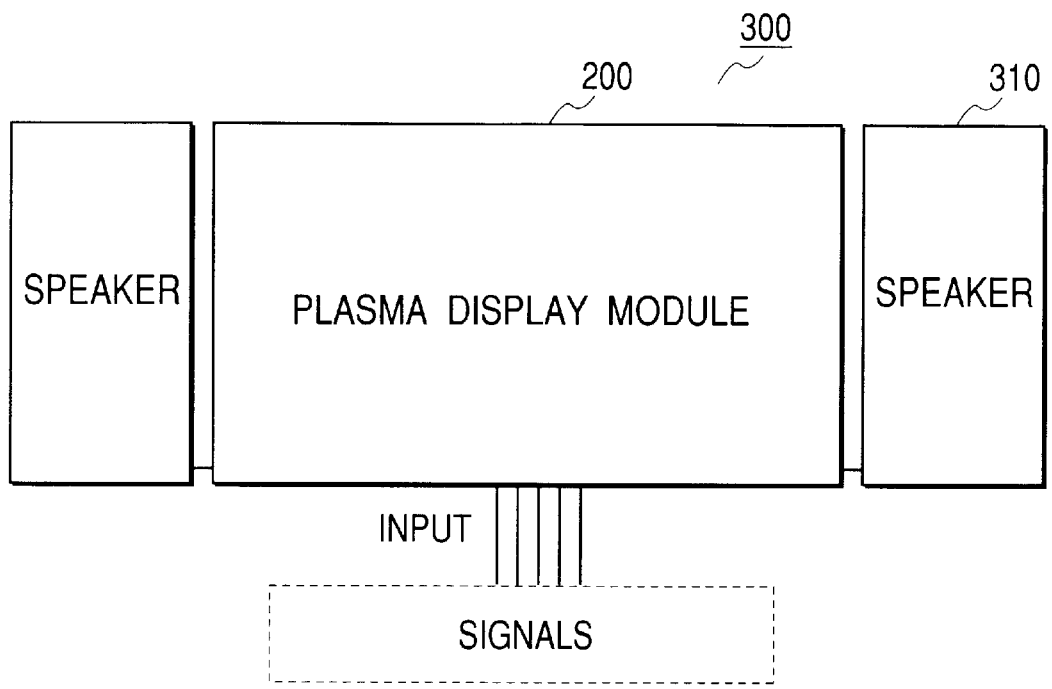
FIG. 5 is a block diagram illustrating the outlined structure of one example of the plasma display monitor equipped with the plasma display module shown in FIG. 4.
Figure 6:
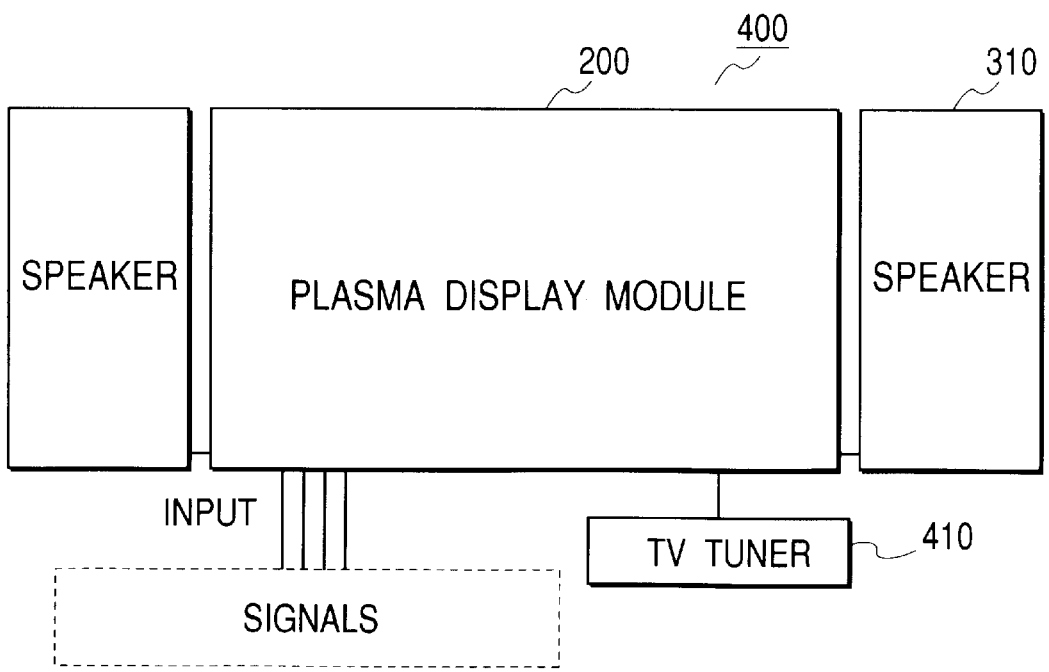
FIG. 6 is a block diagram illustrating the outlined structure of one example of the plasma display television system equipped with the plasma display module shown in FIG. 4.

FIG. 5 is a block diagram illustrating the outlined structure of one example of plasma display monitor 300 provided with the plasma display module shown in FIG. 4. FIG. 6 is a block diagram illustrating the outlined structure of one example of PDP television system 400 provided with the plasma display module 200 shown in FIG. 4. In FIG. 5 and FIG. 6, 310 is a speaker, and 410 is a television tuner. In the plasma display monitor 300 shown in FIG. 5 and plasma display television system 400 shown in FIG. 6, image, voice and power source are supplied from outside.

The image obtained from the above-mentioned display systems has a high luminance and a high image quality. The color temperature at the time of white color display reaches 8,000K or above, and the color temperature is controllable.

EXAMPLE 11

In this example, application of the phosphor of the present invention to a fluorescent lamp is mentioned. In the fluorescent lamps (tubular and planar type), the rare gas resonance line similar to that of the above-mentioned PDP is used as the exciting source of phosphor in the first case, the discharge luminescence of Hg vapor is used in the second case, and these two are made to coexist in the third case. In fluorescent lamps, multiple kinds of phosphors are mixed together and deposited onto inside of lamp, without separately coating individual phosphors, in order to obtain an appropriate white color. In this example, only monochromatic phosphors were formed, and luminous intensities thereof were investigated.

First, a mounting test of the phosphors of Example 2 (Nos. 11–20) on a fluorescent lamp was carried out. Thus, after coating the blue light-emitting phosphor onto inside of a glass tube, electrodes and the like were fit up to prepare a fluorescent lamp. The luminous intensity in the state of fluorescent lamp was roughly the same as that observed in the state of powder, based on that of Comparative Example 1.

Subsequently, fluorescent lamps using the phosphors of Example 4 (Nos. 31–34) were subjected to a mounting test on fluorescent lamp. After coating the above-mentioned blue light-emitting phosphor onto inside of a glass tube, electrodes, etc. were fit up to prepare a fluorescent lamp. Luminous intensity of the phosphor in the state of fluorescent lamp was roughly the same as the luminous intensity evaluated in the state of powder, based on the phosphor of Comparative Example 3.

In the descriptions presented above, the invention of the present inventors has been explained concretely on the basis of the above-mentioned embodiments. The present invention is by no means limited to the embodiment, but can be modified in various manners so long as essentiality thereof is not exceeded.

According to the present invention, phosphor, display device and light source of high performance can be realized.

TABLE 1

|  |  | Composition formula | Powder luminous intensity | PDP luminous intensity |
|---|---|---|---|---|
| Sample No. | 1 | $(Ba_{0.89998}Ca_{0.00001}Sr_{0.00001}Eu_{0.1})O.MgO.5Al_2O_3$ | 101 | 102 |
|  | 2 | $(Ba_{0.8999}Ca_{0.00005}Sr_{0.00005}Eu_{0.1})O.MgO.5Al_2O_3$ | 102 | 103 |
|  | 3 | $(Ba_{0.8998}Ca_{0.0001}Sr_{0.0001}Eu_{0.1})O.MgO.5Al_2O_3$ | 105 | 105 |
|  | 4 | $(Ba_{0.898}Ca_{0.001}Sr_{0.001}Eu_{0.1})O.MgO.5Al_2O_3$ | 110 | 110 |
|  | 5 | $(Ba_{0.89}Ca_{0.005}Sr_{0.005}Eu_{0.1})O.MgO.5Al_2O_3$ | 103 | 103 |
|  | 6 | $(Ba_{0.8989}Ca_{0.001}Sr_{0.0001}Eu_{0.1})O.MgO.5Al_2O_3$ | 108 | 105 |
|  | 7 | $(Ba_{0.8949}Ca_{0.005}Sr_{0.0001}Eu_{0.1})O.MgO.5Al_2O_3$ | 105 | 105 |
|  | 8 | $(Ba_{0.8989}Ca_{0.0001}Sr_{0.001}Eu_{0.1})O.MgO.5Al_2O_3$ | 108 | 108 |
|  | 9 | $(Ba_{0.8949}Ca_{0.0001}Sr_{0.005}Eu_{0.1})O.MgO.5Al_2O_3$ | 115 | 110 |
|  | 10 | $(Ba_{0.88}Ca_{0.01}Sr_{0.01}Eu_{0.1})O.MgO.5Al_2O_3$ | 100 | 95 |
| Comp. Ex. 1 |  | $(Ba_{0.9}Eu_{0.1})O.MgO.5Al_2O_3$ | 100 | 100 |

TABLE 2

|  |  | Composition formula | Powder luminous intensity | PDP luminous intensity |
|---|---|---|---|---|
| Sample No. | 11 | $(Ba_{0.8949}Ca_{0.0001}Sr_{0.005}Eu_{0.01})O.MgO.5Al_2O_3$ | 101 | 101 |
|  | 12 | $(Ba_{0.8949}Ca_{0.0001}Sr_{0.005}Eu_{0.05})O.MgO.5Al_2O_3$ | 105 | 105 |
|  | 13 | $(Ba_{0.8949}Ca_{0.0001}Sr_{0.005}Eu_{0.1})O.MgO.5Al_2O_3$ | 110 | 110 |
|  | 14 | $(Ba_{0.8949}Ca_{0.0001}Sr_{0.005}Eu_{0.2})O.MgO.5Al_2O_3$ | 110 | 110 |
|  | 15 | $(Ba_{0.8949}Ca_{0.0001}Sr_{0.005}Eu_{0.3})O.MgO.5Al_2O_3$ | 105 | 105 |
|  | 16 | $(Ba_{0.8989}Ca_{0.001}Sr_{0.0001}Eu_{0.4})O.MgO.5Al_2O_3$ | 100 | 98 |
|  | 17 | $(Ba_{0.8949}Ca_{0.005}Sr_{0.0001}Eu_{0.1})O.MgO.5Al_2O_3$ | 108 | 105 |
|  | 18 | $(Ba_{0.8949}Ca_{0.005}Sr_{0.0001}Eu_{0.3})O.MgO.5Al_2O_3$ | 110 | 110 |
|  | 19 | $(Ba_{0.8949}Ca_{0.0001}Sr_{0.005}Eu_{0.1})O.MgO.5Al_2O_3$ | 115 | 115 |
|  | 20 | $(Ba_{0.88}Ca_{0.01}Sr_{0.01}Eu_{0.4})O.MgO.5Al_2O_3$ | 95 | 93 |
| Comp. Ex. 1 |  | $(Ba_{0.9}Eu_{0.1})O.MgO.5Al_2O_3$ | 100 | 100 |

TABLE 3

|  |  | Composition formula | Composition x | Composition y | Powder luminous intensity |
|---|---|---|---|---|---|
| Sample No. | 21 | $(Ba_{0.648}Ca_{0.001}Sr_{0.001}Eu_{0.1})O.5.5Al_2O_3$ | 0 | 5.5 | 110 |
|  | 22 | $(Ba_{0.573}Ca_{0.001}Sr_{0.001}Eu_{0.1})O.0.075MgO.5.5Al_2O_3$ | 0.1 | 5.9 | 105 |
|  | 23 | $(Ba_{0.498}Ca_{0.001}Sr_{0.001}Eu_{0.1})O.0.15MgO.5Al_2O_3$ | 0.25 | 6.5 | 103 |
|  | 24 | $(Ba1.14_{98}Ca_{0.0001}Sr_{0.0001}Eu_{0.1})O.0.75MgO.5Al_2O_3$ | 0.6 | 4 | 110 |
|  | 25 | $(Ba_{0.8998}Ca_{0.0001}Sr_{0.0001}Eu_{0.1})O.MgO.5Al_2O_3$ | 1 | 5 | 120 |
|  | 26 | $(Ba_{0.5498}Ca_{0.0001}Sr_{0.0001}Eu_{0.1})O.1.25MgO.5Al_2O_3$ | 1.7 | 6.7 | 115 |
|  | 27 | $(Ba_{0.89}Ca_{0.005}Sr_{0.005}Eu_{0.1})O.MgO.7Al_2O_3$ | 1 | 7 | 110 |
|  | 28 | $(Ba_{0.89}Ca_{0.005}Sr_{0.005}Eu_{0.1})O.2MgO.7Al_2O_3$ | 2 | 7 | 110 |
|  | 29 | $(Ba_{0.59}Ca_{0.005}Sr_{0.005}Eu_{0.1})O.2.2MgO.7Al_2O_3$ | 2.2 | 8.8 | 105 |
|  | 30 | $(Ba_{0.89949}Ca_{0.00001}Sr_{0.0005}Eu_{0.1})O.2MgO.8Al_2O_3$ | 2 | 8 | 110 |
| Comp. Ex. 2 |  | $(Ba_{0.65}Eu_{0.1})O.5.5Al_2O_3$ | 0 | 5.5 | 100 |

TABLE 4

| | | Composition formula | Composition x | Composition y | Powder luminous intensity |
|---|---|---|---|---|---|
| Sample No. | 31 | $(Ba_{0.8998}Ca_{0.0001}Sr_{0.0001}Eu_{0.05}Mn_{0.05})O \cdot 6Al_2O_3$ | 0 | 6 | 110 |
| | 32 | $(Ba_{0.848}Ca_{0.001}Sr_{0.001}Mn_{0.05})O \cdot 0.1MgO \cdot 5.6Al_2O_3$ | 0.1 | 6.7 | 115 |
| | 33 | $(Ba_{0.7489}Ca_{0.001}Sr_{0.0001}Mn_{0.05})O \cdot 0.2MgO \cdot 6Al_2O_3$ | 0.5 | 7.5 | 110 |
| | 34 | $(Ba_{0.4489}Ca_{0.0001}Sr_{0.001}Mn_{0.05})O \cdot 0.5MgO \cdot 6Al_2O_3$ | 1 | 12 | 108 |
| Comp. Ex. 3 | | $(Ba_{0.95}Mn_{0.05})O \cdot 6Al_2O_3$ | 0 | 6 | 100 |

TABLE 5

| | | Composition formula | Concentration of impurity A (wt %) | PDP luminous intensity |
|---|---|---|---|---|
| Sample No. | 35 | $(Ba_{0.8998}Ca_{0.0001}Sr_{0.0001}Eu_{0.1})O \cdot MgO \cdot 5Al_2O_3$:Ce | 0.0001 | 105 |
| | 36 | $(Ba_{0.8998}Ca_{0.0001}Sr_{0.0001}Eu_{0.1})O \cdot MgO \cdot 5Al_2O_3$:Ce | 0.001 | 110 |
| | 37 | $(Ba_{0.8998}Ca_{0.0001}Sr_{0.0001}Eu_{0.1})O \cdot MgO \cdot 5Al_2O_3$:Ce | 0.01 | 102 |
| | 38 | $(Ba_{0.8998}Ca_{0.0001}Sr_{0.0001}Eu_{0.1})O \cdot MgO \cdot 5Al_2O_3$:Ce | 0.1 | 100 |
| | 39 | $(Ba_{0.8998}Ca_{0.0001}Sr_{0.0001}Eu_{0.1})O \cdot MgO \cdot 5Al_2O_3$:Tb | 0.0001 | 105 |
| | 40 | $(Ba_{0.8998}Ca_{0.0001}Sr_{0.0001}Eu_{0.1})O \cdot MgO \cdot 5Al_2O_3$:Tb | 0.01 | 110 |
| | 41 | $(Ba_{0.8998}Ca_{0.0001}Sr_{0.0001}Eu_{0.1})O \cdot MgO \cdot 5Al_2O_3$:Tb | 0.1 | 102 |
| | 42 | $(Ba_{0.8998}Ca_{0.0001}Sr_{0.0001}Eu_{0.1})O \cdot MgO \cdot 5Al_2O_3$:Tb | 1 | 98 |
| | 43 | $(Ba_{0.8998}Ca_{0.0001}Sr_{0.0001}Eu_{0.1})O \cdot MgO \cdot 5Al_2O_3$:Pr | 0.01 | 105 |
| | 44 | $(Ba_{0.8998}Ca_{0.0001}Sr_{0.0001}Eu_{0.1})O \cdot MgO \cdot 5Al_2O_3$:Pr | 1 | 105 |
| | 45 | $(Ba_{0.8998}Ca_{0.0001}Sr_{0.0001}Eu_{0.1})O \cdot MgO \cdot 5Al_2O_3$:Gd | 0.01 | 103 |
| | 46 | $(Ba_{0.8998}Ca_{0.0001}Sr_{0.0001}Eu_{0.1})O \cdot MgO \cdot 5Al_2O_3$:Gd | 1 | 101 |
| Comp. Ex. 4 | | $(Ba_{0.8998}Ca_{0.0001}Sr_{0.0001}Eu_{0.1})O \cdot MgO \cdot 5Al_2O_3$ | 100 | 100 |

TABLE 6

| | | Composition formula | Concentration of impurity B (wt %) | PDP luminous intensity |
|---|---|---|---|---|
| Sample No. | 47 | $(Ba_{0.8949}Ca_{0.0001}Sr_{0.005}Eu_{0.05})O \cdot MgO \cdot 5Al_2O_3$:La | 0.0001 | 101 |
| | 48 | $(Ba_{0.8949}Ca_{0.0001}Sr_{0.005}Eu_{0.05})O \cdot MgO \cdot 5Al_2O_3$:La | 0.01 | 105 |
| | 49 | $(Ba_{0.8949}Ca_{0.0001}Sr_{0.005}Eu_{0.05})O \cdot MgO \cdot 5Al_2O_3$:La | 0.1 | 105 |
| | 50 | $(Ba_{0.8949}Ca_{0.0001}Sr_{0.005}Eu_{0.05})O \cdot MgO \cdot 5Al_2O_3$:La | 1 | 103 |
| | 51 | $(Ba_{0.8949}Ca_{0.0001}Sr_{0.005}Eu_{0.05})O \cdot MgO \cdot 5Al_2O_3$:La | 5 | 101 |
| | 52 | $(Ba_{0.8949}Ca_{0.0001}Sr_{0.005}Eu_{0.05})O \cdot MgO \cdot 5Al_2O_3$:Y | 0.1 | 103 |
| | 53 | $(Ba_{0.8949}Ca_{0.0001}Sr_{0.005}Eu_{0.05})O \cdot MgO \cdot 5Al_2O_3$:Sc | 0.1 | 105 |
| | 54 | $(Ba_{0.8949}Ca_{0.0001}Sr_{0.005}Eu_{0.05})O \cdot MgO \cdot 5Al_2O_3$:Ga | 0.1 | 102 |
| | 55 | $(Ba_{0.8949}Ca_{0.0001}Sr_{0.005}Eu_{0.05})O \cdot MgO \cdot 5Al_2O_3$:Si | 0.1 | 106 |
| Comp. Ex. 5 | | $(Ba_{0.8949}Ca_{0.0001}Sr_{0.005}Eu_{0.05})O \cdot MgO \cdot 5Al_2O_3$ | 100 | 100 |

TABLE 7

| | | Composition formula | Concentrations of A and B (wt %) | PDP luminous intensity |
|---|---|---|---|---|
| Sample | 56 | $(Ba_{0.8649}Ca_{0.0001}Sr_{0.005}Eu_{0.08})O \cdot MgO \cdot 5Al_2O_3$:Ce,La | 0.001, 0.1 | 110 |
| | 57 | $(Ba_{0.8649}Ca_{0.0001}Sr_{0.005}Eu_{0.08})O \cdot MgO \cdot 5Al_2O_3$:Ce,Y | 0.01, 0.1 | 105 |
| | 58 | $(Ba_{0.8649}Ca_{0.0001}Sr_{0.005}Eu_{0.08})O \cdot MgO \cdot 5Al_2O_3$:Tb,La | 0.01, 0.01 | 110 |
| | 59 | $(Ba_{0.8649}Ca_{0.0001}Sr_{0.005}Eu_{0.08})O \cdot MgO \cdot 5Al_2O_3$:Ce,Tb,La,Sc | 0.01, 0.01, 0.01, 0.01 | 115 |
| | 60 | $(Ba_{0.8649}Ca_{0.0001}Sr_{0.005}Eu_{0.08})O \cdot MgO \cdot 5Al_2O_3$:Tb,Ga | 0.1, 0.1 | 112 |
| | 61 | $(Ba_{0.8649}Ca_{0.0001}Sr_{0.005}Eu_{0.08})O \cdot MgO \cdot 5Al_2O_3$:Tb,Si | 0.1, 0.1 | 105 |
| | 62 | $(Ba_{0.8649}Ca_{0.0001}Sr_{0.005}Eu_{0.08})O \cdot MgO \cdot 5Al_2O_3$:Pr,Si | 0.01, 0.01 | 108 |
| | 63 | $(Ba_{0.8649}Ca_{0.0001}Sr_{0.005}Eu_{0.08})O \cdot MgO \cdot 5Al_2O_3$:Pr,Y | 0.1, 0.01 | 110 |
| | 64 | $(Ba_{0.8649}Ca_{0.0001}Sr_{0.005}Eu_{0.08})O \cdot MgO \cdot 5Al_2O_3$:Gd,Sc | 0.01, 0.1 | 105 |
| | 65 | $(Ba_{0.8649}Ca_{0.0001}Sr_{0.005}Eu_{0.08})O \cdot MgO \cdot 5Al_2O_3$:Gd,Ga | 0.1, 0.01 | 108 |
| Comp. Ex. 6 | | $(Ba_{0.8649}Ca_{0.0001}Sr_{0.005}Eu_{0.08})O \cdot MgO \cdot 5Al_2O_3$ | 100 | 100 |

What is claimed is:

1. A phosphor emitting a visible light under excitation by ultraviolet light of 100 nm to 400 nm, having the following formula:

$$(Ba_{1-a-b-c}Ca_aSr_bM_c)O \cdot xMgO \cdot yAl_2O_3$$

wherein M is at least one element selected from Eu, Tm, Lu and Mn, and a, b, c, x and y satisfy the following conditions:

$0 < a \leq 0.01$, $0 < b \leq 0.01$, $0.01 \leq c \leq 0.3$, $0 \leq x \leq 2.2$, and $0 \leq y \leq 12.0$.

2. A phosphor according to claim 1, wherein M is at least one element selected from Eu, Tm, Lu and Mn, and a, b, c, x and y satisfy the following conditions:

$0 < a \leq 0.005$, $0 < b \leq 0.005$, $0.01 \leq c \leq 0.3$, $0.6 \leq x \leq 1.7$, and $4.0 \leq y \leq 6.7$.

3. A phosphor according to claim 1, emitting a blue-colored light, wherein M is at least one element selected from Eu, Tm and Lu, and a, b, c, x and y satisfy the following conditions:

$0.00001 \leq a \leq 0.005$, $0.00001 \leq b \leq 0.005$, $0.01 \leq c \leq 0.3$, $0.6 \leq x \leq 1.7$, and $4.0 \leq y \leq 6.7$.

4. A phosphor according to claim 1, to which element A is additionally added, which is represented by the following formula:

$$(Ba_{1-a-b-c}Ca_aSr_bM_c)O \cdot xMgO \cdot y5Al_2O_3:A$$

wherein A is at least one element selected from Ce, Tb, Pr and Gd.

5. A phosphor according to claim 1, to which element B is additionally added, which is represented by the following formula:

$$(Ba_{1-a-b-c}Ca_aSr_bM_c)O \cdot xMgO \cdot y5Al_2O_3:B$$

wherein B is at least one element selected from La, Y, Sc, Ga and Si.

6. A phosphor according to claim 1, to which both element A and element B are additionally added, which is represented by the following formula:

$$(Ba_{1-a-b-c}Ca_aSr_bM_c)O \cdot xMgO \cdot y5Al_2O_3:A,B$$

wherein A is at least one element selected from Ce, Tb, Pr and Gd, and B is at least one element selected from La, Y, Sc, Ga and Si.

7. A phosphor according to claim 4, wherein said element A is added in an amount not less than 0.0001% by weight and not greater than 1% by weight as measured by high-frequency inductively coupled plasma mass spectrum analysis (ICP-MS analysis).

8. A phosphor according to claim 5, wherein said element B is added in an amount not less than 0.0001% by weight and not greater than 5% by weight as measured by ICP-MS analysis.

9. A display device comprising at least a plasma-discharging display panel, wherein the phosphor layer emitting blue-colored or green-colored light among the red-, green- and blue-colored light emitting phosphor layers of said display panel comprises the following phosphor:

a phosphor emitting a visible light under excitation by ultraviolet light of 100 nm to 400 nm, having the following formula:

$$(Ba_{1-a-b-c}Ca_aSr_bM_c)O \cdot xMgO \cdot yAl_2O_3$$

wherein M is at least one element selected from Eu, Tm, Lu and Mn and a, b, c, x and y satisfy the following conditions:

$0 < a \leq 0.01$, $0 < b \leq 0.01$, $0.01 \leq c \leq 0.3$, $0 \leq x \leq 2.2$, and $4.0 \leq y \leq 12.0$.

10. A display device according to claim 9, wherein M is at least one element selected from Eu, Tm, Lu and Mn and a, b, c, x and y satisfy the following conditions:

$0 < a \leq 0.005$, $0 < b \leq 0.005$, $0.01 \leq c \leq 0.3$, $0.6 \leq x \leq 1.7$, and $4.0 \leq y \leq 6.7$.

11. A display device according to claim 9, wherein said phosphor emits a blue-colored light, wherein M is at least one element selected from Eu, Tm and Lu and a, b, c, x and y satisfy the following conditions:

$0.00001 \leq a \leq 0.005$, $0.00001 \leq b \leq 0.005$, $0.01 \leq c \leq 0.3$, $0.6 \leq x \leq 1.7$, and $4.0 \leq y \leq 6.7$.

12. A display device having at least a plasma-discharge display panel, wherein the thermal emission spectrum of the phosphor layer emitting a blue-colored light among the phosphor layers of said display panel emitting red-, green- and blue-colored lights has a ratio of the signal intensity in the high temperature range of 300K to 600K to the signal intensity in the low temperature range of 100K to 300K of 1 or less.

13. A display device according to claim 12, wherein the phosphor layer emitting a blue-colored light emits a visible light under excitation by ultraviolet light of 100 nm to 400 nm and has the following formula:

$$(Ba_{1-a-b-c}Ca_aSr_bM_c)O \cdot xMgO \cdot yAl_2O_3$$

wherein M is at least one element selected from Eu, Tm, Lu and Mn and a, b, c, x and y satisfy the following conditions:

$0 < a \leq 0.005$, $0 < b \leq 0.005$, $0.01 \leq c \leq 0.3$, $0.6 \leq x \leq 1.7$, and $4.0 \leq y \leq 6.7$.

14. A display device according to claim 12, wherein the phosphor layer emits a blue-colored light, wherein M is at least one element selected from Eu, Tm and Lu, and a, b, c, x and y satisfy the following conditions:

$0.00001 \leq a \leq 0.005$, $0.00001 \leq b \leq 0.005$, $0.01 \leq c \leq 0.3$, $0.6 \leq x \leq 1.7$, and $4.0 \leq y \leq 6.7$.

15. A light source comprising at least a fluorescent lamp in which a gas emitting an ultraviolet light including a wavelength of 400 nm or less upon discharge is sealed in a glass container and a driver circuit for driving said fluorescent lamp, wherein the phosphor layer of said fluorescent lamp is comprised of the following phosphor:

a phosphor emitting visible light under excitation by ultraviolet light of 100 nm to 400 nm and having the following formula:

$$(Ba_{1-a-b-c}Ca_aSr_bM_c)O \cdot xMgO \cdot yAl_2O_3$$

wherein M is at least one element selected from Eu, Tm, Lu and Mn and a, b, c, x and y satisfy the following conditions:

$0 < a \leq 0.01$,
$0 < b \leq 0.01$,
$0.01 \leq c \leq 0.3$,
$0 \leq x \leq 2.2$, and
$4.0 \leq y \leq 12.0$.

16. A light source according to claim 15, wherein M is at least one element selected from Eu, Tm, Lu and Mn and a, b, c, x and y satisfy the following conditions:

$0 < a \leq 0.005$,
$0 < b \leq 0.005$,
$0.01 \leq c \leq 0.3$,
$0.6 \leq x \leq 1.7$, and
$4.0 \leq y \leq 6.7$.

17. A light source according to claim 15, wherein said phosphor emits a blue-colored light, wherein M is at least one element selected from Eu, Tm and Lu, and a, b, c, x and y satisfy the following conditions:

$0.00001 \leq a \leq 0.005$,
$0.00001 \leq b \leq 0.005$,
$0.01 \leq c \leq 0.3$,
$0.6 \leq x \leq 1.7$, and
$4.0 \leq y \leq 6.7$.

18. A fluorescent lamp including the luminescent phosphor of claim 1.

19. A fluorescent lamp including the luminescent phosphor of claim 2.

20. A fluorescent lamp including the luminescent phosphor of claim 3.

* * * * *